United States Patent
Li et al.

(10) Patent No.: US 12,449,704 B2
(45) Date of Patent: Oct. 21, 2025

(54) DISPLAY PANEL AND DISPLAY APPARATUS

(71) Applicant: BOE Technology Group Co., Ltd., Beijing (CN)

(72) Inventors: Wei Li, Beijing (CN); Xiaofeng Zhang, Beijing (CN); Yanqing Chen, Beijing (CN); Zhao Zhang, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/014,176

(22) PCT Filed: Feb. 28, 2022

(86) PCT No.: PCT/CN2022/078446
§ 371 (c)(1),
(2) Date: Jan. 3, 2023

(87) PCT Pub. No.: WO2023/159615
PCT Pub. Date: Aug. 31, 2023

(65) Prior Publication Data
US 2025/0093717 A1    Mar. 20, 2025

(51) Int. Cl.
*G02F 1/1362* (2006.01)
*G02F 1/1335* (2006.01)

(52) U.S. Cl.
CPC .. *G02F 1/136286* (2013.01); *G02F 1/133512* (2013.01); *G02F 1/133514* (2013.01); *G02F 2201/56* (2013.01)

(58) Field of Classification Search
CPC ......... G02F 1/136286; G02F 1/133512; G02F 1/133514; G02F 2201/56
See application file for complete search history.

(56) References Cited

U.S. PATENT DOCUMENTS 9,964,821 B2 * 5/2018 Wu .................... G02F 1/133345
10,976,612 B1 * 4/2021 Chi .................... G02F 1/133305
(Continued)

FOREIGN PATENT DOCUMENTS

| CN | 104407469 A | 3/2015 |
| CN | 104570467 A | 4/2015 |

(Continued)

*Primary Examiner* — Kevin Quarterman
(74) *Attorney, Agent, or Firm* — Ling Wu; Stephen Yang; Ling and Yang Intellectual Property

(57) ABSTRACT

Disclosed is a display panel including a first substrate which includes a first base substrate and a black matrix layer disposed on the first base substrate, and a second substrate which includes a second base substrate and multiple first signal lines disposed on the second base substrate. The black matrix layer includes multiple first body structures corresponding to the multiple first signal lines and a first compensation structure is provided on one side of at least one first body structure. In a curved surface where the first substrate is located, the first body structure and the first compensation structure extend along the second direction and are arranged along the fourth direction. An orthographic projection of any one of the first signal lines on the second substrate is located within a range of orthographic projections of a corresponding first body structure and a first compensation structure on the second substrate.

24 Claims, 17 Drawing Sheets

(56) References Cited

U.S. PATENT DOCUMENTS

| | | | |
|---|---|---|---|
| 11,016,326 B2* | 5/2021 | Hasegawa | G02F 1/133514 |
| 11,226,513 B2* | 1/2022 | Wang | G02F 1/13394 |
| 11,385,488 B2* | 7/2022 | Chikama | G02F 1/133354 |
| 2008/0137013 A1* | 6/2008 | Kamoshida | G02F 1/133305 |
| | | | 349/160 |
| 2015/0168792 A1 | 6/2015 | Woo et al. | |
| 2015/0362796 A1* | 12/2015 | Kong | G02F 1/133512 |
| | | | 349/110 |
| 2016/0139457 A1 | 5/2016 | Wu | |
| 2016/0349561 A1* | 12/2016 | Shiina | G02F 1/133512 |
| 2017/0090242 A1 | 3/2017 | Peng | |
| 2018/0031906 A1 | 2/2018 | Park et al. | |
| 2019/0377220 A1 | 12/2019 | Ohhitsu | |
| 2020/0041835 A1 | 2/2020 | Asamizu et al. | |

FOREIGN PATENT DOCUMENTS

| | | |
|---|---|---|
| CN | 104714322 A | 6/2015 |
| CN | 104880850 A | 9/2015 |
| CN | 107664859 A | 2/2018 |
| CN | 108132560 A | 6/2018 |
| CN | 108375850 A | 8/2018 |
| CN | 108469700 A | 8/2018 |
| CN | 108803123 A | 11/2018 |
| CN | 110515244 A | 11/2019 |
| CN | 110579895 A | 12/2019 |
| IN | 109445166 A | 3/2019 |
| JP | 2010-8875 A | 1/2010 |
| JP | 2020-21029 A | 2/2020 |
| WO | 2015192384 A1 | 12/2015 |

\* cited by examiner

DISPLAY PANEL AND DISPLAY APPARATUS

CROSS-REFERENCE TO RELATED APPLICATION

The present application is a U.S. National Phase Entry of International Application No. PCT/CN2022/078446 having an international filing date of Feb. 28, 2022. The entire contents of the above-identified application are hereby incorporated by reference.

TECHNICAL FIELD

Embodiments of the present disclosure relate to, but are not limited to, the field of display technologies, and in particular, relate to a display panel and a display apparatus.

BACKGROUND

In recent years, a curved display panel has been more favored due to its better viewing angle characteristics and wide field of view. The curved display panel has been widely used in a large-sized product with a display function, such as a computer, a television (TV), a medical monitoring device, and a vehicle-mounted central control device.

SUMMARY

The following is a summary of subject matters described herein in detail. This summary is not intended to limit the scope of protection of claims.

A display panel is provided in an exemplary embodiment of the present disclosure, and the display panel includes a first substrate and a second substrate disposed oppositely, wherein the first substrate and the second substrate are of a curved surface structure; the first substrate includes a first base substrate and a black matrix layer disposed on a side of the first base substrate close to the second substrate; the second substrate includes a second base substrate and multiple first signal lines disposed on a side of the second base substrate close to the first substrate, wherein the multiple first signal lines extend along a second direction and are arranged along a fourth direction, and the fourth direction intersects with the second direction in a curved surface where the second substrate is located; the black matrix layer includes multiple first body structures corresponding to the multiple first signal lines, and a first compensation structure is provided on one side of at least one of the first body structures; in a curved surface where the first substrate is located, the first body structure and the first compensation structure extend along the second direction and are arranged along the fourth direction, and the fourth direction intersects with the second direction in the curved surface where the first substrate is located; an orthographic projection of any one of the first signal lines on the second substrate is located within a range of orthographic projections of a corresponding first body structure and a first compensation structure on the second substrate.

In an exemplary implementation mode, the display panel is bent toward a side of the second substrate away from the first substrate, and in the fourth direction, for any set of a first body structure and a first compensation structure, the first compensation structure is located between the first body structure and a first center line; or, the display panel is bent toward a side of the first substrate away from the second substrate, and in the fourth direction, for any set of a first body structure and a first compensation structure, the first body structure is located between the first compensation structure and a first center line; wherein the first center line is a center line of the display panel extending along the second direction.

In an exemplary implementation mode, the display panel includes a first side and a second side disposed oppositely along the fourth direction, on a curved surface where the display panel is located, between a first center line and the first side, from a first compensation structure at a position close to a third center line to a first compensation structure at a position away from the third center line, sizes of first compensation structures along the fourth direction gradually decrease; between the first center line and the second side, from a first compensation structure at a position close to a fourth center line to a first compensation structure at a position away from the fourth center line, sizes of first compensation structures along the fourth direction gradually decrease.

The third center line is a center line of the display panel extending along the second direction between the first center line and the first side, and the fourth center line is a center line of the display panel extending along the second direction between the first center line and the second side.

In an exemplary implementation mode, in the curved surface where the display panel is located, the display panel is divided into multiple regions along the fourth direction, the multiple regions include one first region and two k-th regions, wherein 2≤k≤N, and N is a positive integer greater than or equal to 2, and two regions corresponding to any value of k are symmetrically disposed with respect to the first center line along the fourth direction; sizes of multiple first compensation structures located in the first region along the fourth direction are the same, and sizes of multiple first compensation structures located in regions corresponding to a same value of k along the fourth direction are the same.

In an exemplary implementation mode, N=3, the multiple regions include one first region, two second regions, and two third regions, wherein the first region is disposed symmetrically with respect to the first center line along the fourth direction, the two second regions are disposed symmetrically with respect to the first center line along the fourth direction, and the two third regions are disposed symmetrically with respect to the first center line along the fourth direction.

In the display panel located between the first center line and the first side, a first region and a third region are disposed symmetrically with respect to the third center line along the fourth direction, and a second region is disposed symmetrically with respect to the third center line along the fourth direction; in the display panel located between the first center line and the second side, a first region and a third region are disposed symmetrically with respect to the fourth center line along the fourth direction, and a second region is disposed symmetrically with respect to the fourth center line along the fourth direction.

In an exemplary implementation mode, in a curved surface where the display panel is located, each of two sides of a first center line is divided into N-2 concentric annular regions; a region located at a center position inside an annular region is a first region, and a region located at a periphery of the annular region is an N-th region, and there are two J-th regions for any J-th region on the display panel, a value of J is 1 to N; the two J-th regions are located on both sides of the first center line and the two J-th regions are symmetrical with respect to the first center line in the fourth direction W; any J-th region is disposed symmetrically with respect to a second center line, and the second center line is a center line of the display panel extending along the fourth direction; sizes of multiple first compensation structures located at a position of the first region position along the fourth direction are the same, and sizes of multiple first compensation structures located in regions corresponding to a same value of J along the fourth direction are the same.

In an exemplary implementation mode, N=3, multiple regions include two first regions, two second regions, and two third regions. A second region is an annular region, a first region is located at a center position of the annular region of the second region, and a third region is located at a peripheral region of the annular region of the second region.

In an exemplary implementation mode, on the curved surface where the display panel is located, on a same side of the first center line, from a first compensation structure in a region close to a center position of an annular region to a first compensation structure in a region away from a center position of an annular region, sizes of first compensation structures along the fourth direction gradually decrease.

In an exemplary implementation mode, in the curved surface where the display panel is located, a size of the first compensation structure along the fourth direction is set according to at least one of a size of the first base substrate and the second base substrate along a bending direction, a size of the first substrate and the second substrate along the second direction, a size of the first substrate and the second substrate along the fourth direction, and a radius of curvature of the display panel; wherein the radius of curvature of the display panel is a radius of curvature of the curved surface where the display panel is located.

In an exemplary implementation mode, in a curved surface where the display panel is located, a size of the first compensation structure along the fourth direction is proportional to a size of the first base substrate and the second base substrate along a bending direction.

In an exemplary implementation mode, in a case where all of a size of the first substrate and the second substrate along the second direction, a size of the first substrate and the second substrate along the fourth direction, and a radius of curvature of the display panel remain unchanged, the size of the first compensation structure along the fourth direction has a linear relationship with a sum of sizes of the first base substrate and the second base substrate along the bending direction.

In an exemplary implementation mode, in the display panel having a size of 14.6 inches and a radius of curvature of 780 mm, a relationship between the size of the first compensation structure along the fourth direction and the sizes of the first base substrate and the second base substrate along the bending direction is expressed through a following formula: $y=30.314x-0.1673$; wherein x is the sum of the sizes of the first base substrate and the second base substrate along the bending direction, y is the size of the first compensation structure along the fourth direction; x is greater than or equal to 0.3 microns and less than or equal to 1 micron; y is greater than or equal to 8 microns and less than or equal to 30 microns.

In an exemplary implementation mode, in a curved surface where the display panel is located, a size of the first compensation structure along the fourth direction is proportional to a size of the first substrate and the second substrate along the fourth direction.

In an exemplary implementation mode, in a case where all of a size of the first base substrate and the second base substrate along a bending direction, a width-length ratio of the display panel, and a radius of curvature of the display panel remain unchanged, the size of the first compensation structure along the fourth direction has a linear relationship with the size of the first substrate and the second substrate along the fourth direction; wherein the width-length ratio is a ratio of a size of the display panel along the second direction to a size of the display panel along the fourth direction.

In an exemplary implementation mode, in the display panel in which sizes of the first base substrate and the second base substrate along the bending direction are both 0.2 microns, the radius of curvature is 780 mm, and the width-length ratio of the display panel is 55%, a relationship between the size of the first compensation structure along the fourth direction and the size of the first substrate and the second substrate along the fourth direction is expressed through a following formula: $y=0.0364x+0.0131$; wherein x is the size of the first substrate and the second substrate along the fourth direction, y is the size of the first compensation structure along the fourth direction; x is greater than or equal to 250 mm and less than or equal to 550 mm; and y is greater than or equal to 8 microns and less than or equal to 20 microns.

In an exemplary implementation mode, in the display panel in which sizes of the first base substrate and the second base substrate along the bending direction are both 0.2 mm, the radius of curvature is 780 mm, and the width-length ratio of the display panel is 37%, a relationship between the size of the first compensation structure along the fourth direction and the size of the first substrate and the second substrate along the fourth direction is expressed through a following formula: $y=0.0231x-0.1021$; wherein x is the size of the first substrate and the second substrate along the fourth direction, y is the size of the first compensation structure along the fourth direction; x is greater than or equal to 250 mm and less than or equal to 550 mm; and y is greater than or equal to 5 microns and less than or equal to 15 microns.

In an exemplary implementation mode, in a range of a width-length ratio greater than or equal to 10% and less than or equal to 60%, a size of the first compensation structure along the fourth direction is proportional to the width-length ratio in a case where all of a radius of curvature, a size of the first base substrate and the second base substrate along a bending direction, and a size of the first substrate and the second substrate along the fourth direction remain unchanged; wherein the width-length ratio is a ratio of a size of the display panel along the second direction to a size of the display panel along the fourth direction.

In an exemplary implementation mode, in the display panel in which a radius of curvature is 780 mm, sizes of the first base substrate and the second base substrate along the bending direction are both 0.15 mm, and a size of the first substrate and the second substrate along the fourth direction is 327.7 mm, a relationship between the size of the first compensation structure along the fourth direction and the width-length ratio is expressed through a following formula: $y=19.536x-1.823$; wherein x is the width-length ratio of the display panel, y is the size of the first compensation structure along the fourth direction; a value range of x is greater than or equal to 10% and less than or equal to 60%; and y is greater than or equal to 0.9 microns and less than or equal to 9 microns.

In an exemplary implementation mode, a size of the first compensation structure along the fourth direction is proportional to a displacement amount of the display panel along a bending direction.

The displacement amount of the display panel along the bending direction is a vertical distance between a position of a center line of the display panel having a curved structure extending along the second direction and a position of a midpoint of a line connecting two ends of the display panel having the curved structure.

In an exemplary implementation mode, in a case where all of a size of the first substrate and the second substrate along the second direction, a size of the first substrate and the second substrate along the fourth direction, and a size of the first base substrate and the second base substrate along the bending direction remain unchanged, the size of the first compensation structure along the fourth direction has a linear relationship with the displacement amount of the display panel along the bending direction.

In an exemplary implementation mode, in the display panel in which a size is 12.3 inches, and sizes of the first base substrate and the second base substrate along the bending direction are both 0.2 mm, the size of the first compensation structure along the fourth direction and the displacement amount of the display panel along the bending direction are expressed through a following formula: $y=0.5221x-0.017$; wherein x is the displacement amount of the display panel along the bending direction, y is the size of the first compensation structure along the fourth direction; a value range of x is greater than or equal to 2 mm, and less than or equal to 14 mm; and y is greater than or equal to 1 micron and less than or equal to 8 microns.

In an exemplary implementation mode, the displacement amount of the display panel along the bending direction has a following relationship with a radius of curvature of the display panel: $M=R-R*\cos((L/2)/R)$; wherein L is the size of the display panel along the fourth direction, R is the radius of curvature of a curved surface where the display panel is located, and M is the displacement amount of the display panel along the bending direction. In an exemplary implementation mode, the radius of curvature R may be 780 mm to 5000 mm, and the displacement amount M of the display panel along the bending direction may be 2 mm to 14 mm.

In an exemplary implementation mode, the black matrix layer further includes a second compensation structure, and the second compensation structure and the first compensation structure are disposed symmetrically with respect to a center line of the first body structure extending along the second direction.

In an exemplary implementation mode, the first substrate further includes multiple color resistance elements disposed on one side of the first substrate close to the second substrate, and in the curved surface where the first substrate is located, the multiple color resistance elements are alternately disposed with the first body structure and the first compensation structure in the fourth direction and extend along the second direction.

In an exemplary implementation mode, the first substrate is further provided with a first alignment layer and multiple support structures, and the black matrix layer and the multiple color resistance elements are located between the first alignment layer and the first base substrate, and the support structures are disposed on one side of the first alignment layer close to the second substrate; the black matrix layer further includes multiple third body structures corresponding to the multiple support structures, a third compensation structure is provided on at least one of the third body structures, and in the curved surface where the first substrate is located, the third compensation structure is located on one side of the third body structure in the fourth direction; an orthographic projection of a support structure on the second substrate is located within a range of orthographic projections of the third body structure and the third compensation structure on the second substrate; there is an overlapping region between the third body structure and the first body structure; a size of the third body structure and the third compensation structure along the fourth direction is larger than a size of the first body structure and the first compensation structure along the fourth direction.

In an exemplary implementation mode, in the curved surface where the display panel is located, a size of the third compensation structure along the fourth direction are set in a same manner as a size of the first compensation structure along the fourth direction.

In an exemplary implementation mode, the display panel is bent toward a side of the second substrate away from the first substrate, and in the fourth direction, for any set of a third body structure and a third compensation structure, the third compensation structure is located between the third body structure and a first center line; or, the display panel is bent toward a side of the first substrate away from the second substrate, and in the fourth direction, for any set of a third body structure and a third compensation structure, the third body structure is located between the third compensation structure and a first center line; wherein the first center line is a center line of the display panel extending along the second direction.

In an exemplary implementation mode, multiple second signal lines and vias are further provided on a side of the second base substrate close to the first substrate, and the second signal lines extend along the fourth direction in the curved surface where the second substrate is located and are arranged along the second direction; the black matrix layer further includes multiple second body structures corresponding to the multiple second signal lines, and the multiple second body structures extend along the fourth direction in the curved surface where the first substrate is located, and are arranged along the second direction; orthographic projections of the multiple second signal lines and the vias on the second substrate are within a range of an orthographic projection of a corresponding second body structure on the second substrate; and there is an overlapping region between the first body structure, the second body structure, and the third body structure.

In an exemplary implementation mode, the black matrix layer further includes a fourth compensation structure, and the fourth compensation structure and the third compensation structure are disposed symmetrically with respect to a center line of the third body structure extending along the second direction.

In an exemplary implementation mode, the black matrix layer further includes a fifth compensation structure and a sixth compensation structure, and the fifth compensation structure and the sixth compensation structure are disposed symmetrically with respect to a center line of the third body structure extending along the fourth direction.

A display apparatus is also provided in an embodiment of the present disclosure, and the display apparatus includes the display panel according to any one of the aforementioned embodiments.

After drawings and detailed descriptions are read and understood, other aspects may be understood.

BRIEF DESCRIPTION OF DRAWINGS

The drawings are intended to provide a further understanding of technical solutions of the present disclosure and constitute a part of the specification, and are used for explaining the technical solutions of the present disclosure together with the embodiments of the present disclosure, and are not intended to constitute a limitation on the technical solutions of the present disclosure. A shape and a size of each component in the drawings do not reflect actual scales, and are only intended to schematically illustrate contents of the present disclosure.

DETAILED DESCRIPTION

Figure 1A:
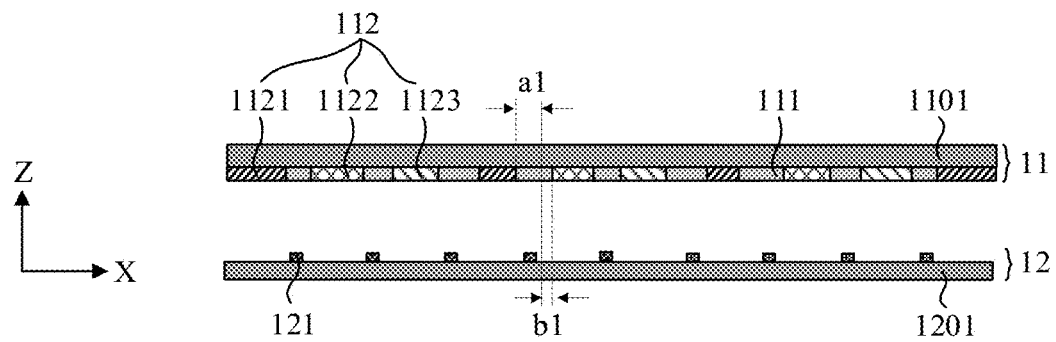
FIG. 1a is a schematic diagram of a cross-sectional structure of a display panel in an unbent state according to an embodiment of the present disclosure.

The embodiments of the present disclosure will be described in detail below with reference to the drawings. Implementation modes may be carried out in multiple different forms. Those of ordinary skill in the art may easily understand such a fact that modes and contents may be transformed into various forms without departing from the purpose and scope of the present disclosure. Therefore, the present disclosure should not be interpreted as being limited to contents recorded in following implementation modes only. The embodiments in the present disclosure and features in the embodiments may be arbitrarily combined with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in an actual process, but are not limited thereto. For example, a thickness and a pitch of each film layer, and a width and a pitch of each signal line may be adjusted according to an actual situation. The drawings described in the present disclosure are only schematic diagrams of structures, and one mode of the present disclosure is not limited to shapes or numerical values or the like shown in the drawings.

Ordinal numerals such as "first", "second", and "third" in the specification are set to avoid confusion of constituent elements, but are not intended to limit in terms of quantity.

In the specification, for convenience, wordings indicating orientation or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The position relationships between the constituent elements are appropriately changed according to a direction in which each constituent element is described. Therefore, the positional relationships are not limited to the words and phrases used in the specification, and appropriate substitutions may be made according to a situation.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two elements. For those of ordinary skill in the art, specific meanings of the above terms in the present disclosure may be understood according to a specific situation.

In the specification, an "electrical connection" includes a case where constituent elements are connected together through an element having some electrical function. The "element having some electrical function" is not particularly limited as long as electrical signals may be sent and received between the connected constituent elements. Examples of the "element having some electrical function" not only include an electrode and a wiring, but also a switch element such as a transistor, a resistor, an inductor, a capacitor, another element having one or more functions, and the like.

In the specification, "parallel" refers to a state in which an angle formed by two straight lines is −10° or more and 10° or less, and thus may include a state in which the angle is −5° or more and 5° or less. In addition, "perpendicular" refers to a state in which an angle formed by two straight lines is 80° or more and 100° or less, and thus may include a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

In the specification, a triangle, rectangle, trapezoid, pentagon, or hexagon, etc. is not in a strict sense, and may be an approximate triangle, rectangle, trapezoid, pentagon, or hexagon, etc. There may be some small deformation caused by tolerance, and there may be a chamfer, an arc, and deformation, etc.

In the present disclosure, "about" refers to that a boundary is defined not so strictly and numerical values within process and measurement error ranges are allowed.

In the present disclosure, a "thickness" is a dimension of a film layer in a direction perpendicular to a substrate.

A standard for measuring a curved display panels is a curvature, which may indicate a bending degree of the curved display panel. For a curved display panel with a determined size, the smaller the curvature is, the greater the radian of the display panel is and the smaller the bending degree is. A reciprocal of a radius of a curvature is the curvature. The larger the radius of the curvature is, the smaller the bending degree of the display panel is, and the smaller the radius of the curvature is, the greater the bending degree of the display panel is. Different types of products have different usage environments and different requirements for size and curvature. Common curvature radii are 2000 mm, 3000 mm, etc., and there is a tendency to develop towards smaller curvature radii (such as 1500 mm, 750 mm) to adapt to different application scenarios or usage environments.

A thin film transistor liquid crystal display panel generally includes a color film substrate, an array substrate, and a liquid crystal layer located between the color film substrate and the array substrate, etc. A curved surface is usually curved with different curvatures by cold bending or hot bending. Affected by a Young's modulus and a Poisson's ratio of a material, an internal structure will be changed during bending, and the color film substrate and the array substrate will be prone to misalignment and shift, which will easily lead to poor image quality such as color crossover. In addition, due to an influence of photoelastic properties of a substrate subjected to a bending external force, a phase difference is generated, adding an anisotropy of liquid crystal, a macroscopic performance is that light leakage will occur under an effect of a picture in a dark state. As a curvature of a bending radius decreases, the greater the stress is, and the more obvious the light leakage is.

Figure 1B:
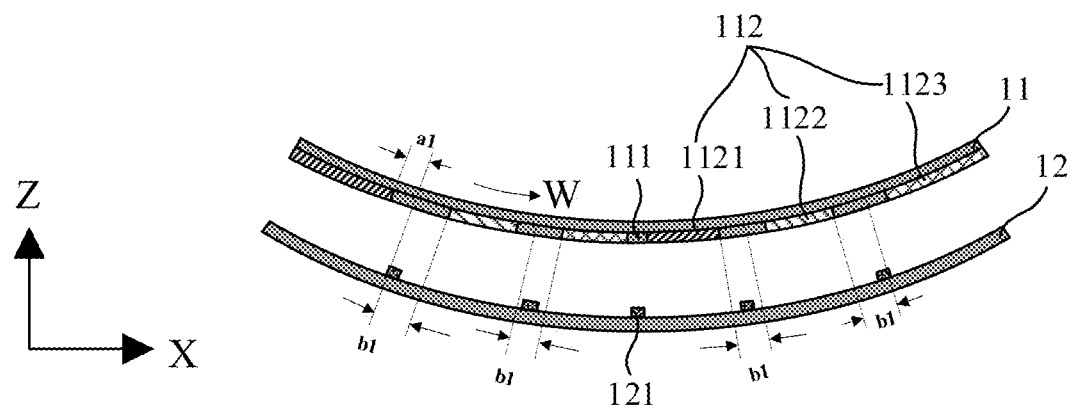
FIG. 1b is a schematic diagram of a cross-sectional structure of a display panel according to an embodiment of the present disclosure.
Figure 1C:
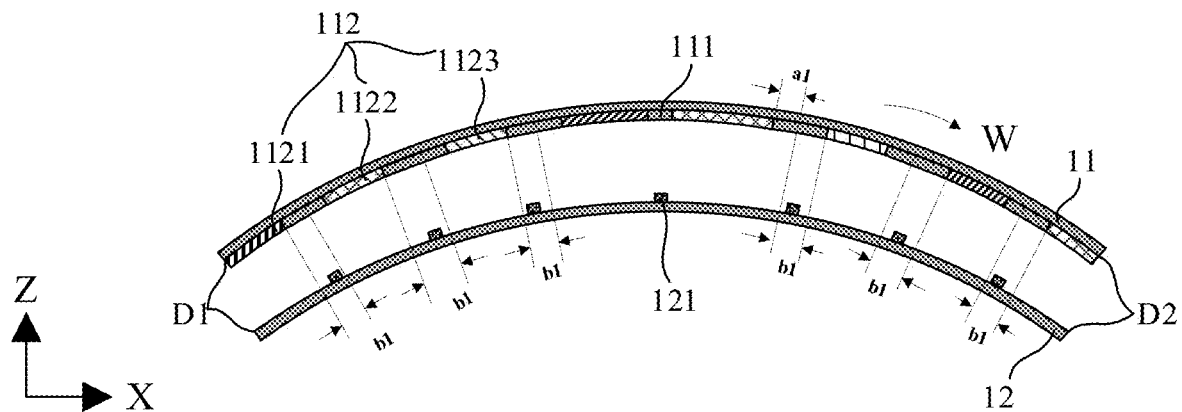
FIG. 1c is a schematic diagram of a cross-sectional structure of a display panel according to an embodiment of the present disclosure.

A display panel is provided in an embodiment of the present disclosure, as shown in FIGS. 1b to 1c, the display panel may include a first substrate 11 and a second substrate 12 disposed oppositely, and the first substrate 11 and the second substrate 12 are of a curved surface structure.

The first substrate 11 may include a first base substrate 1101 and a black matrix layer 111 disposed on a side of the first base substrate 1101 close to the second substrate 12.

The second substrate 12 may include a second base substrate 1201 and multiple first signal lines 121 disposed on a side of the second base substrate 1201 close to the first substrate 11, wherein the multiple first signal lines 121 extend along a second direction Y and are arranged along a fourth direction W, and the fourth direction W intersects with the second direction Y in a curved surface where the second substrate 12 is located.

The black matrix layer 111 may include multiple first body structures a1 corresponding to the multiple signal lines 121, and a first compensation structure b1 is provided on one side of at least one first body structure a1. In a curved surface where the first substrate 11 is located, the first body structure a1 and the first compensation structure b1 extend along the second direction Y and extend along the fourth direction, and the fourth direction intersects with the second direction in the curved surface where the first substrate 11 is located.

An orthographic projection of any one of the first signal lines 121 on the second substrate 12 is within a range of an orthographic projection of a corresponding first body structure a1 and a first compensation structure b1 on the second substrate 12.

According to the display panel provided in the embodiment of the present disclosure, by disposing a first compensation structure on one side of at least one first body structure in a black matrix layer, an orthographic projection of a first signal line on a second substrate is in a range of an orthographic projection of a corresponding first body structure and a first compensation structure on the second substrate, to a large extent, a phenomenon of color crossover of a curved display panel and light leakage of the display panel under an effect of a picture in a dark state is avoided.

In an exemplary implementation mode, in the curved surface where the second substrate 12 is located (or in the curved surface where the first substrate 11 is located, or in a curved surface where the display panel is located), the fourth direction W is perpendicular to the second direction Y, that is, the fourth direction W is a direction in which a radian of the curved surface where the display panel is located extends.

In an exemplary implementation mode, as shown in FIG. 1b, the display panel is bent toward a side of the second substrate 12 away from the first substrate 11, and in the fourth direction W, in any set of a first body structure a1 and a first compensation structure b1, the first compensation structure b1 is located between the first body structure a1 and a first center line; wherein the first center line is a center line (Q-Q) of the display panel extending along the second direction Y. In a structure shown in FIG. 1b, a center of a curvature of the curved surface where the display panel is located is located on a side of the first substrate 11 away from the second substrate 12.

Figure 1D:
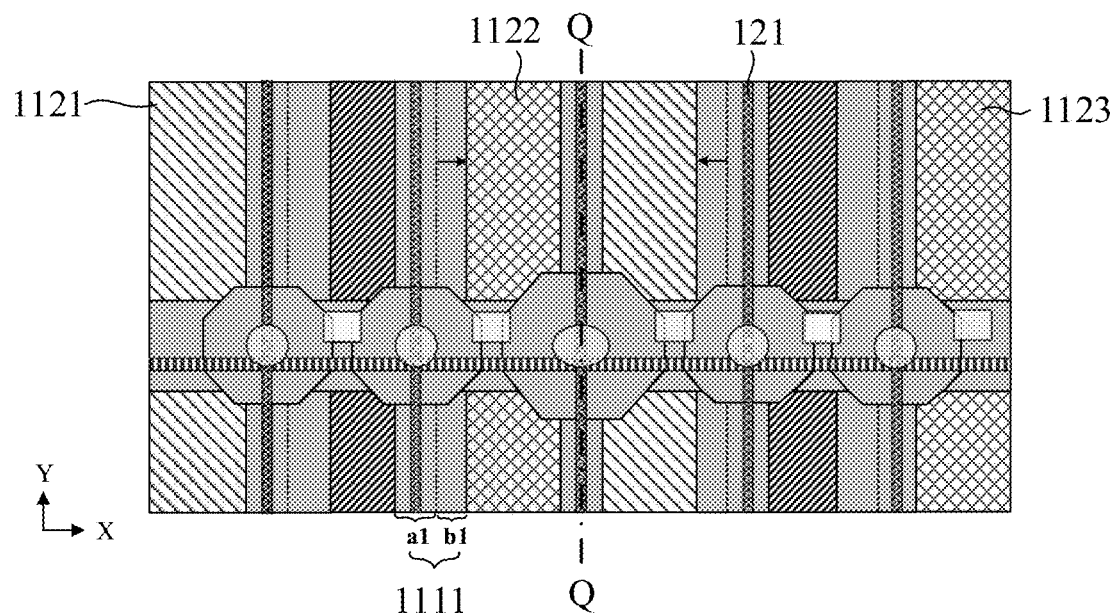
FIG. 1d is a schematic diagram of a partial planar structure of a display panel according to an embodiment of the present disclosure.

In an exemplary implementation mode, FIGS. 1a and 1d are respectively a schematic diagram of a cross-sectional structure and a schematic diagram of a planar structure, of the display panel, in an unbent state, shown in FIG. 1b. An orthographic projection of a first signal line 121 on the second substrate 12 is within a range of an orthographic projection of a corresponding first body structure a1 on the second substrate 12, and an orthographic projection of a center line of the first body structure a1 extending along the second direction Y on the second substrate 12 is overlapped with an orthographic projection of a center line of the first signal line 121 extending along the second direction Y on the second substrate 12. In any set of a first body structure a1 and a first compensation structure b1, the first compensation structure b1 is located between the first body structure a1 and a first center line Q-Q.

In an exemplary implementation mode, as shown in FIG. 1c, the display panel is bent toward a side of the first substrate 11 away from the second substrate 12, and in the fourth direction, in any set of a first body structure a1 and a first compensation structure b1, the first body structure a1 is located between the first compensation structure b1 and a first center line, wherein the first center line is a center line (Q-Q) of the display panel extending along the second direction Y. In a structure shown in FIG. 1c, a center of a curvature of the curved surface where the display panel is located is located on a side of the second substrate 12 away from the first substrate 11.

Figure 1E:
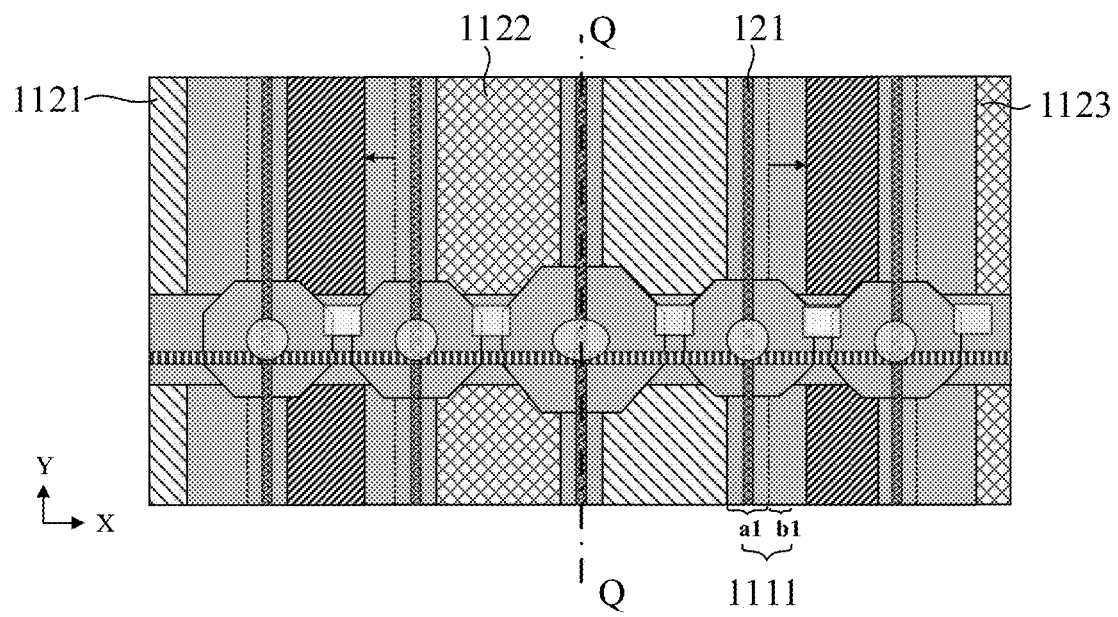
FIG. 1e is a schematic diagram of a partial planar structure of a display panel according to an embodiment of the present disclosure.
Figure 1F:
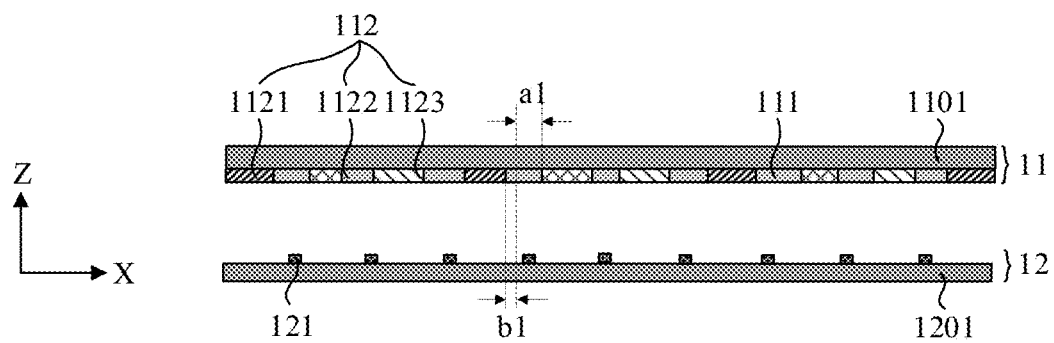
FIG. 1f is a schematic diagram of a cross-sectional structure of a display panel in an unbent state according to an embodiment of the present disclosure.

In an exemplary implementation mode, FIGS. 1e and 1f are respectively a schematic diagram of a planar structure and a schematic diagram of a cross-sectional structure, of the display panel, in an unbent state, shown in FIG. 1c. An orthographic projection of a first signal line 121 on the second substrate 12 is within a range of an orthographic projection of a corresponding first body structure a1 on the second substrate 12, and an orthographic projection of a center line of the first body structure a1 extending along the second direction Y on the second substrate 12 is overlapped with an orthographic projection of a center line of a corresponding first signal line 121 extending along the second direction Y on the second substrate 12. In the fourth direction W, in any set of a first body structure a1 and a first compensation structure b1, the first body structure a1 is located between the first compensation structure b1 and a first center line, as shown in FIG. 1e, wherein the first center line is a center line (Q-Q) of the display panel extending along the second direction Y.

In the embodiment of the present disclosure, the first signal line 121 may be a data signal line, the first substrate 11 may be a color film substrate, and the second substrate 12 may be an array substrate.

In an exemplary implementation mode, in a curved surface where the display panel is located, a size of a first compensation structure b1 along the fourth direction W may be set according to at least one of a size of the first base substrate 1101 and the second base substrate 1201 along a bending direction, a size of the first substrate 11 and the second substrate 12 along the second direction Y, a size of the first substrate 11 and the second substrate 12 along the fourth direction W, a radius of curvature R of the display panel. The radius of curvature R of the display panel is a radius of curvature of the curved surface where the display panel is located.

In an implementation mode of the present disclosure, the size of the first base substrate 1101 and the second base substrate 1201 along the bending direction may be understood as a thickness of the first base substrate 1101 and the second base substrate 1201, the size of the first substrate 11 and the second substrate 12 along the second direction Y may be understood as a width of the first substrate 11 and the second substrate 12 or as a width of the display panel, and the size of the first substrate 11 and the second substrate 12 along the fourth direction W may be understood as a length of the first substrate 11 and the second substrate 12 or as a length of the display panel.

In an exemplary implementation mode, in the curved surface where the display panel is located, a size of a first compensation structure b1 along the fourth direction W is proportional to a size of the first base substrate 1101 and the second base substrate 1201 in the bending direction.

Figure 3A:
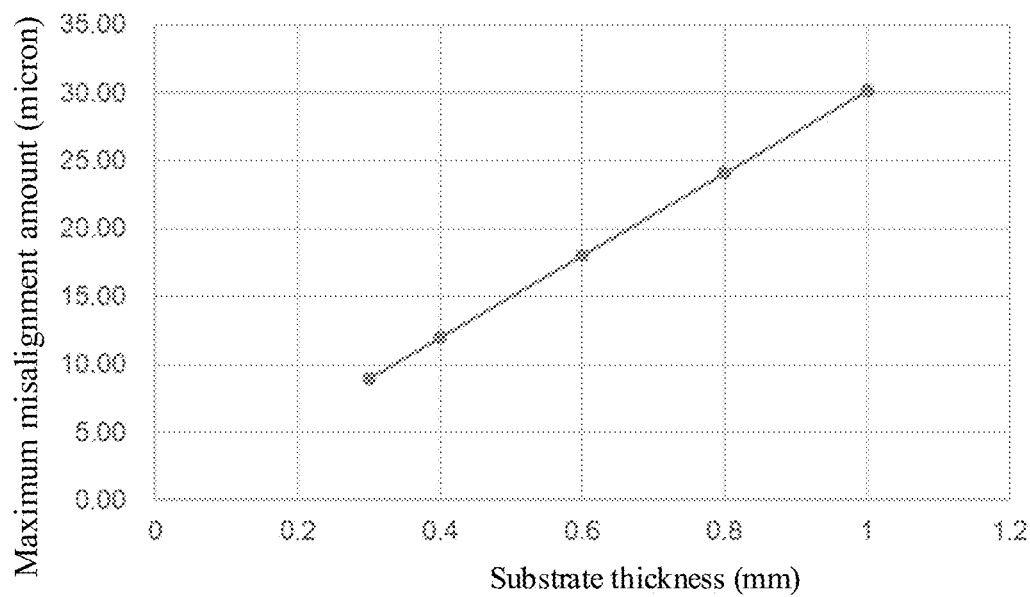
FIG. 3a is a schematic diagram showing a relationship between a maximum misalignment amount of a simulated curved display panel and a substrate thickness.

In an exemplary implementation mode, in a case where all of the size of the first substrate 11 and the second substrate 12 along the second direction Y, the size of the first substrate 11 and the second substrate 12 along the fourth direction W, and the radius of curvature of the display panel remain unchanged, the size of the first compensation structure b1 along the fourth direction W has a linear relationship with a sum of sizes of the first base substrate 1101 and the second base substrate 1201 along the bending direction. As shown in FIG. 3a, the size of the first compensation structure b1 along the fourth direction W may be a maximum misalignment amount on an ordinate in FIG. 3a, and the size of the first compensation structure b1 along the fourth direction W has a linear relationship with the size of the first base substrate 1101 and the second base substrate 1201 in the bending direction. In FIG. 3a, a thickness of a base substrate on an abscissa may be a sum of the sizes (i.e. thicknesses) of the first base substrate 1101 and the second base substrate 1201 along the bending direction.

In an exemplary implementation mode, in a display panel with a size of 14.6 inches and a radius of curvature of 780 mm, a relationship between a size of a first compensation structure b1 along a fourth direction W and a size of a first base substrate 1101 and a second base substrate 1201 along a bending direction may be expressed through a following formula.

$$y = 30.314x - 0.1673$$

Among them, x is a sum of the sizes of the first base substrate 1101 and the second base substrate 1201 along the bending direction, y is the size of the first compensation structure b1 along the fourth direction W; x is greater than or equal to 0.3 microns and less than or equal to 1 micron; y is greater than or equal to 8 microns and less than or equal to 30 microns.

In an exemplary implementation mode, in the curved surface where the display panel is located, the size of the first compensation structure b1 in the fourth direction W is proportional to a size of the first substrate 11 and the second substrate 12 along the fourth direction W.

Figure 3B:
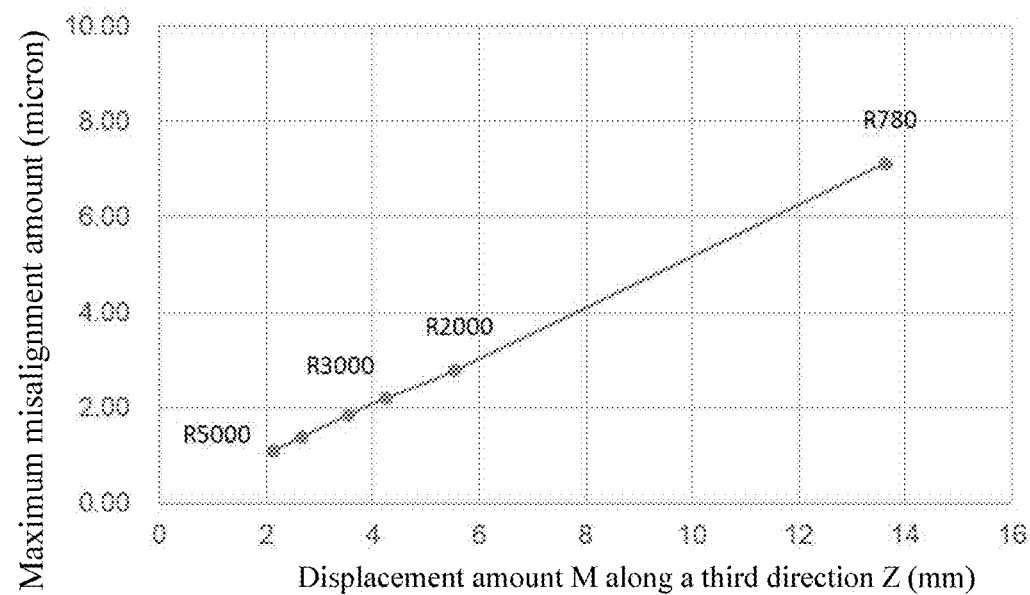
FIG. 3b is a schematic diagram showing a relationship between a maximum misalignment amount of a simulated curved display panel and a substrate thickness.
Figure 3C:
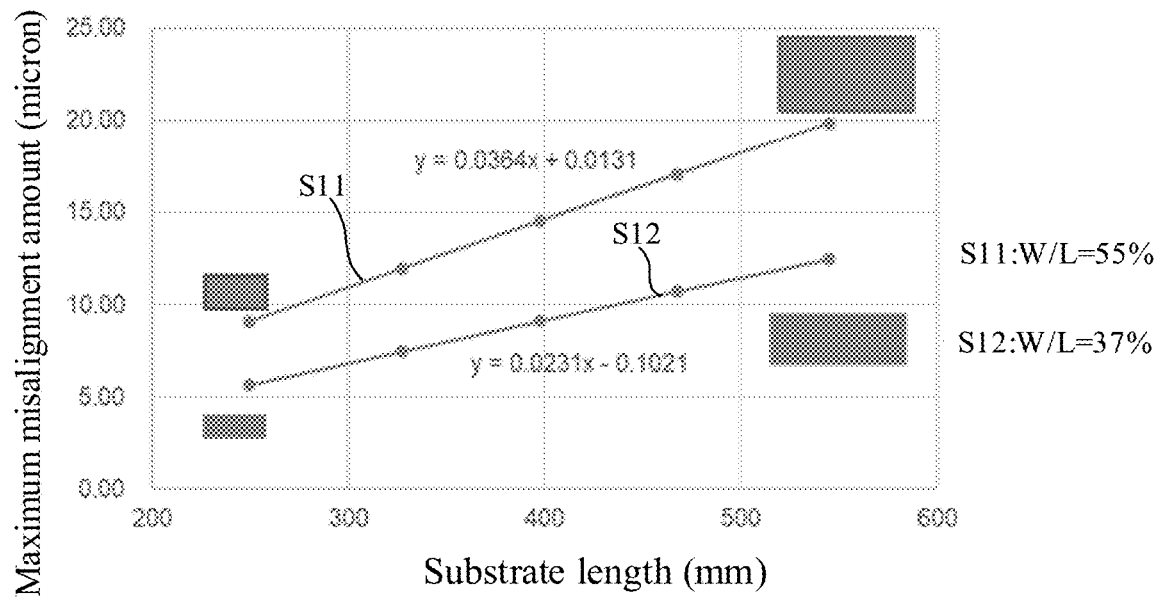
FIG. 3c is a schematic diagram showing a relationship between a maximum misalignment amount of a simulated curved display panel and a length of the display panel.

In an exemplary implementation mode, in the curved surface where the display panel is located, in a case where all of a size of the first base substrate 1101 and the second base substrate 1201 along the bending direction, a width-length ratio of the display panel, and a radius of curvature of the display panel remain unchanged, the size of the first compensation structure b1 along the fourth direction W has a linear relationship with the size of the first substrate 11 and the second substrate 12 along the fourth direction W; the width-length ratio is a ratio of a size of the display panel along the second direction Y to a size of the display panel along the fourth direction W. As shown in FIG. 3c, the size of the first compensation structure b1 along the fourth direction W may be a maximum misalignment amount on an ordinate in FIG. 3c, the size of the first substrate 11 and the second substrate 12 along the fourth direction W may be a length of a substrate on an abscissa in FIG. 3c, and the size of the first compensation structure b1 in the fourth direction W may have a linear relationship with the size of the first substrate 11 and the second substrate 12 along the fourth direction W.

In an exemplary implementation mode, in a display panel in which sizes of a first base substrate 1101 and a second base substrate 1201 along a bending direction are both 0.2 microns, a radius of curvature is 780 mm, and a width-length ratio of the display panel is 55%, a relationship between a size of a first compensation structure b1 in a fourth direction W and a size of a first substrate 11 and a second substrate 12 along the fourth direction W may be expressed through a following formula.

$$y = 0.0364x + 0.0131$$

Among them, x is the size of the first substrate 11 and the second substrate 12 along the fourth direction W, y is the size of the first compensation structure b1 along the fourth direction W; x is greater than or equal to 250 mm and less than or equal to 550 mm; y is greater than or equal to 8 microns and less than or equal to 20 microns.

In an exemplary implementation mode, in a display panel in which sizes of a first base substrate 1101 and a second base substrate 1102 along a bending direction are both 0.2 mm, a radius of curvature is 780 mm, and a width-length ratio of the display panel is 37%, a relationship between a size of a first compensation structure b1 in a fourth direction W and a size of a first substrate 11 and a second substrate 12 along the fourth direction W may be expressed through a following formula.

$$y = 0.0231x - 0.1021$$

Among them, x is the size of the first substrate 11 and the second substrate 12 along the bending direction W, y is the size of the first compensation structure b1 along the fourth direction W; x is greater than or equal to 250 mm and less than or equal to 550 mm; y is greater than or equal to 5 microns and less than or equal to 15 microns.

Figure 3D:
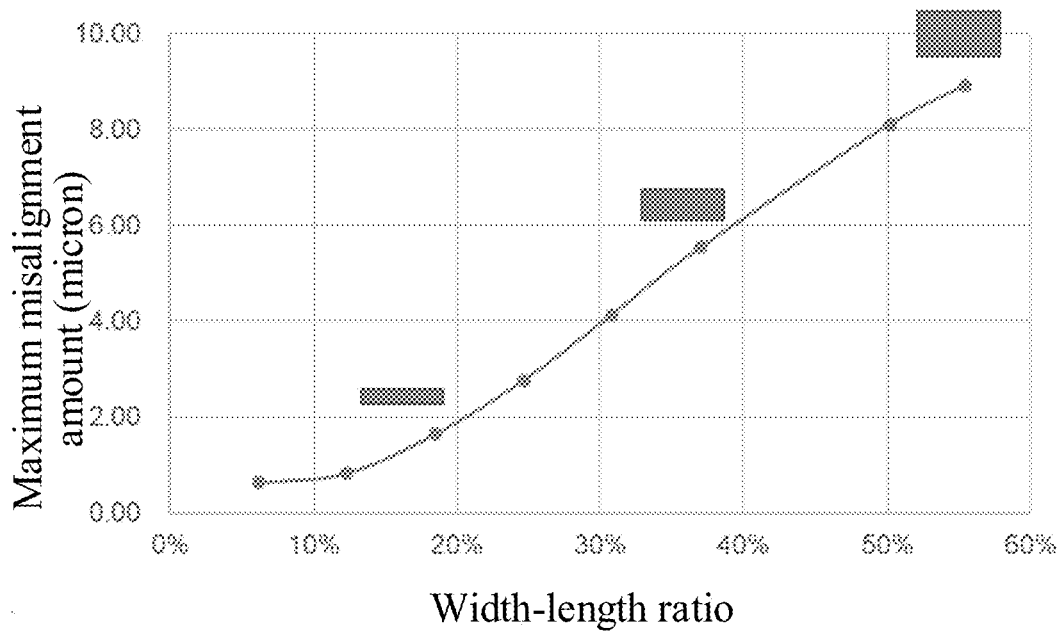
FIG. 3d is a schematic diagram showing a relationship between a maximum misalignment amount of a simulated curved display panel and a width-length ratio of the display panel.

In an exemplary implementation mode, in a display panel with a width-length ratio greater than or equal to 10% and less than or equal to 60%, in a case where all of a radius of curvature of the display panel, a size of a first base substrate 1101 and a second base substrate 1201 along a bending direction, and a size of a first substrate 11 and a second substrate 12 along a fourth direction W remain unchanged, a size of a first compensation structure b1 in the fourth direction W is proportional to the width-length ratio. As shown in FIG. 3d, the size of the first compensation structure b1 along the fourth direction W may be a maximum misalignment amount on an ordinate in FIG. 3d.

In an exemplary implementation mode, as shown in FIG. 3d, in a display panel in which a radius of curvature is 780 mm, sizes of a first base substrate 1101 and a second base substrate 1201 along a bending direction are both 0.15 mm, and a size of the first substrate 11 and the second substrate 12 along a fourth direction W is 327.7 mm, a relationship between a size of a first compensation structure b1 in the fourth direction W and a width-length ratio may be expressed through a following formula.

$$y = 19.536x - 1.823$$

Among them, x is the width-length ratio of the display panel, y is the size of the first compensation structure b1 along the fourth direction W; a value range of x is greater than or equal to 10% and less than or equal to 60%; y is greater than or equal to 0.9 microns and less than or equal to 9 microns.

In an exemplary implementation mode, the size of the first compensation structure b1 in the fourth direction W may be proportional to a displacement amount of the display panel along the bending direction.

Figure 2A:
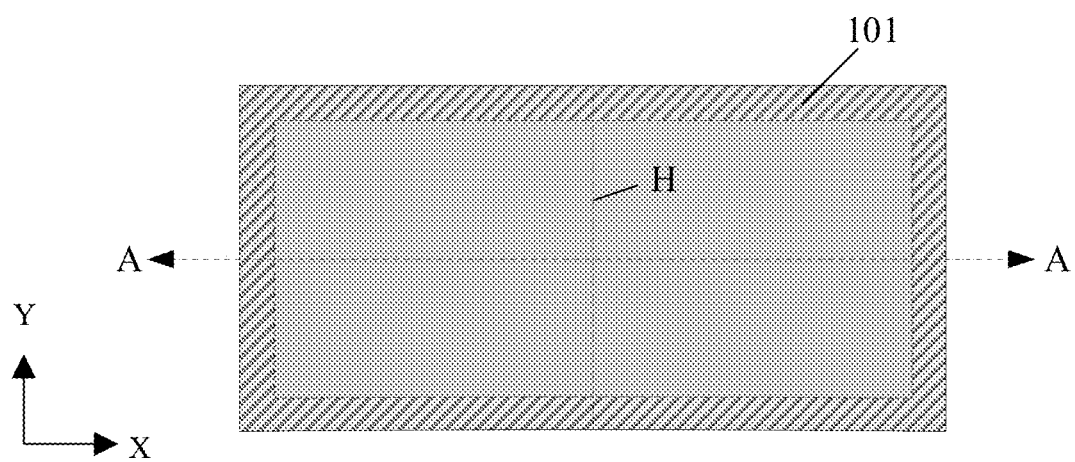
FIG. 2a is a schematic diagram of a planar structure of a simulated display panel according to an exemplary implementation mode of the present disclosure.
Figure 2B:
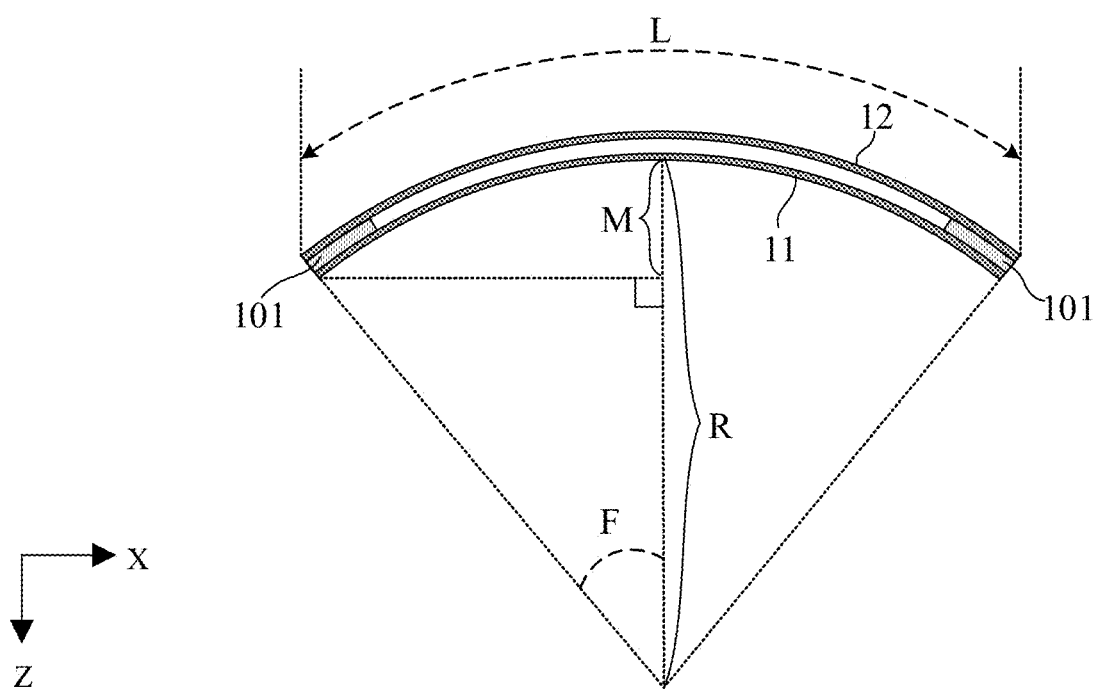
FIG. 2b is a schematic diagram of a cross-sectional structure of a simulated display panel according to an exemplary implementation mode of the present disclosure.

The displacement amount of the display panel along the bending direction is a vertical distance between a position of a center line of a curved display panel extending along the second direction Y and a position of a midpoint of a line connecting two ends of the curved display panel. As shown in FIG. 2b, M is the displacement amount of the display panel along the bending direction.

In an exemplary implementation mode, in a case where all of the size of the first substrate 11 and the second substrate 12 along the second direction Y, the size of the first substrate 11 and the second substrate 12 along the fourth direction W, and the size of the first base substrate 1101 and the second base substrate 1201 along the bending direction remain unchanged, the size of the first compensation structure b1 along the fourth direction W has a linear relationship with the displacement amount of the display panel along the bending direction. As shown in FIG. 3b, and the size of the first compensation structure b1 along the fourth direction W may be a maximum misalignment amount on an ordinate in FIG. 3b. In an exemplary implementation mode, in a range of a radius of curvature between 780 mm and 2000 mm, in a case where all of a size of the first substrate 11 and the second substrate 12 along the second direction Y, a size of the first substrate 11 and the second substrate 12 along the fourth direction W, and a size of the first base substrate 1101 and the second base substrate 1201 along the bending direction remain unchanged, the size of the first compensation structure b1 along the fourth direction W has a linear relationship with the displacement amount of the display panel along the bending direction.

In an exemplary implementation mode, as shown in FIG. 3b, in a display panel with a size of 12.3 inches, in which sizes of the first base substrate 1101 and the second base substrate 1102 along the bending direction are both 0.2 mm, a relationship between the size of the first compensation structure b1 along the fourth direction W and the displacement amount of the display panel along the bending direction is expressed through a following formula.

$$y = 0.5221x - 0.017$$

Among them, x is the displacement amount of the display panel along the bending direction, y is the size of the first compensation structure b1 along the fourth direction W; a value range of x is greater than or equal to 2 mm and less than or equal to 14 mm; y is greater than or equal to 1 micron and less than or equal to 8 microns.

In an exemplary implementation mode, the displacement amount of the display panel along the bending direction has a following relationship with a radius of curvature of the display panel.

$$M = R - R * \cos((L/2)/R)$$

As shown in FIG. 2b, L is a size of the display panel along the fourth direction W, R is a radius of curvature of a curved surface where the display panel is located, and M is the displacement amount of the display panel in the bending direction. In an exemplary implementation mode, the radius of curvature R may be 780 mm to 5000 mm, and the displacement amount M of the display panel in the bending direction may be 2 mm to 14 mm.

Figure 8:
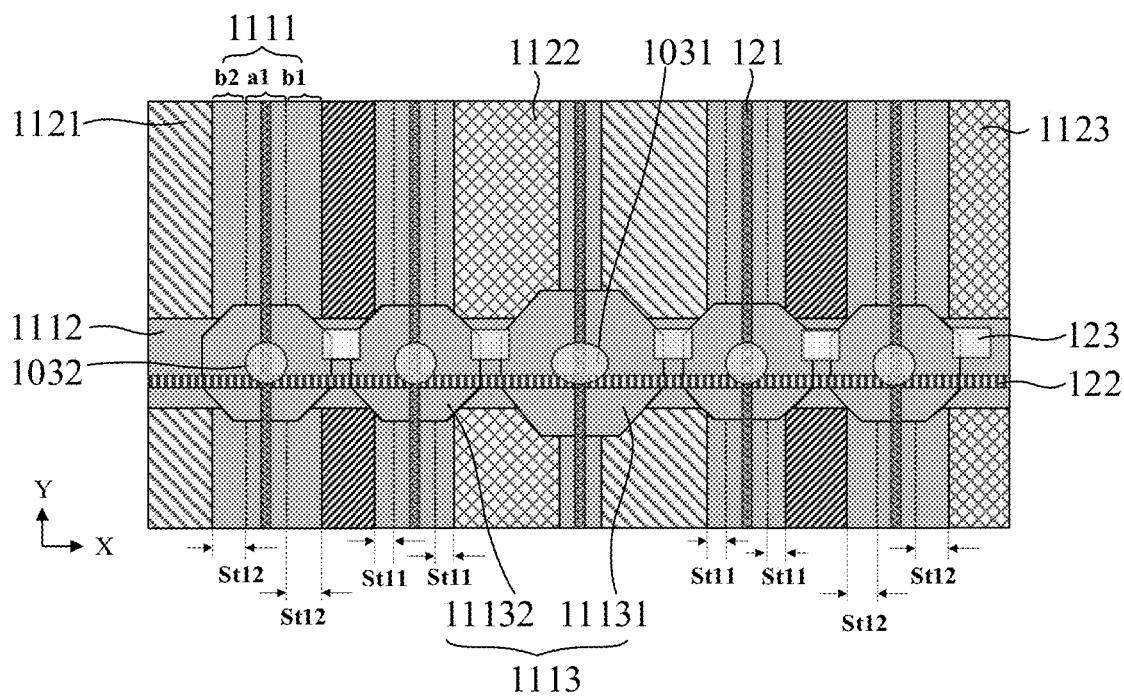
FIG. 8 is a schematic diagram of a partial planar structure of a display panel according to an exemplary embodiment of the present disclosure.

In an exemplary implementation mode, as shown in FIG. 8, the black matrix layer 111 may further include a second compensation structure b2, and the second compensation structure b2 and the first compensation structure b1 are disposed symmetrically with respect to a center line of the first body structure a1 extending along the second direction Y. In the embodiment of the present disclosure, the first compensation structure b1 and the second compensation structure b2 are symmetrically disposed on both sides of the first body structure a1, so that a compensation mode is simple and a process may be simplified.

In an exemplary implementation mode, as shown in FIG. 1, the first substrate 11 further includes multiple color resistance elements 112 disposed on a side of the first base substrate 1101 close to the second substrate 12. In the curved surface where the first substrate 11 is located, the multiple color resistance elements 112 are alternately disposed with the first body structure a1 and the first compensation structure b1 in the fourth direction W and extend along the second direction Y.

Figure 6A:
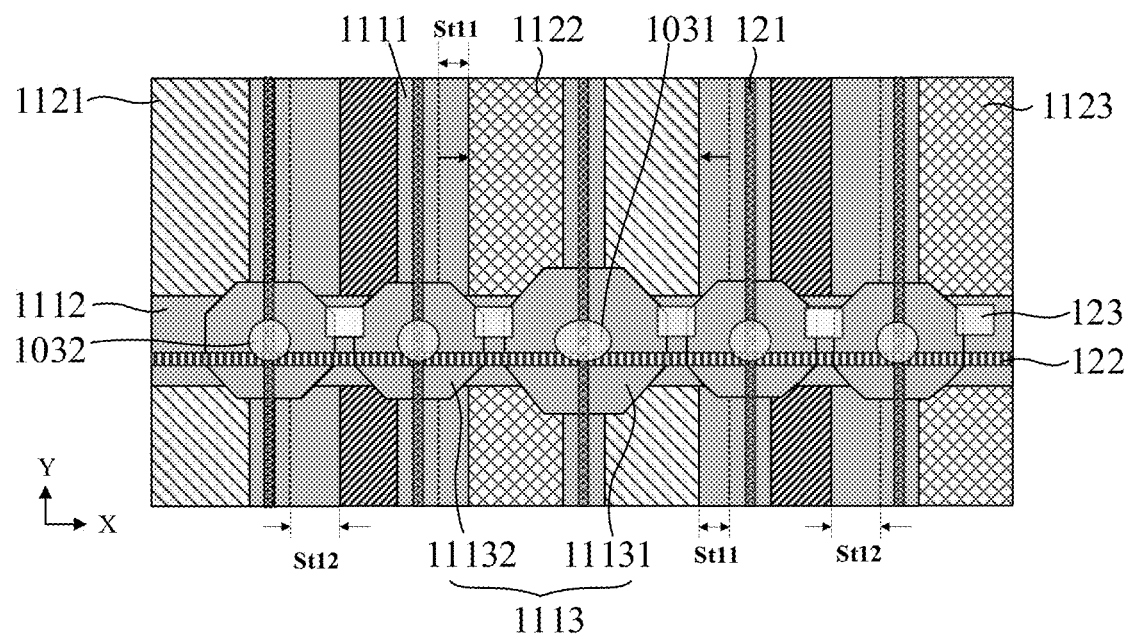
FIG. 6a is a schematic diagram of a partial planar structure of a display panel according to an exemplary embodiment of the present disclosure.
Figure 6B:
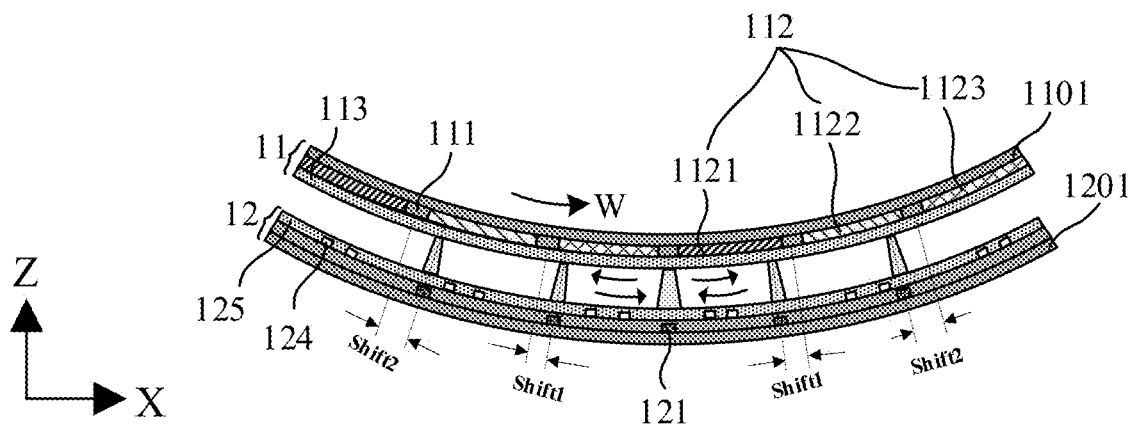
FIG. 6b is a schematic diagram of a cross-sectional structure of a display panel.
Figure 6C:
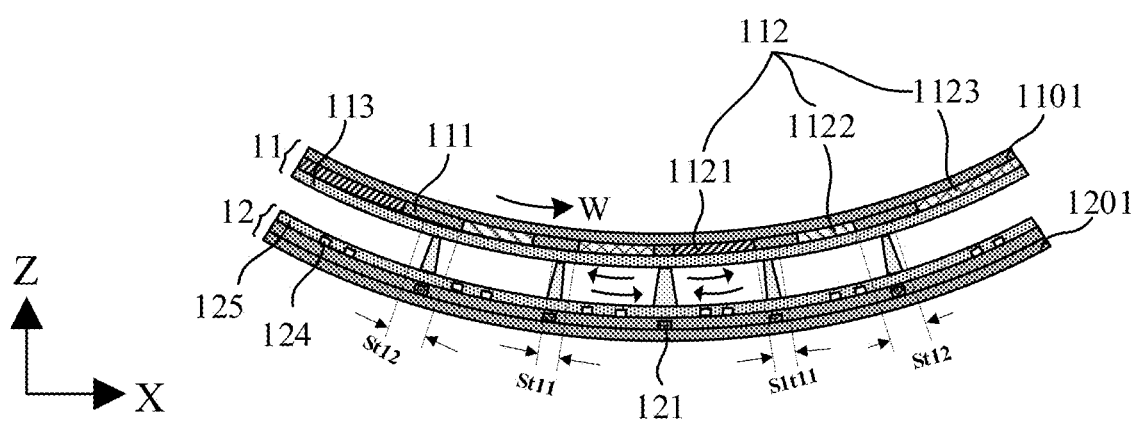
FIG. 6c is a schematic diagram of a cross-sectional structure of a display panel according to an exemplary embodiment of the present disclosure.
Figure 10A:
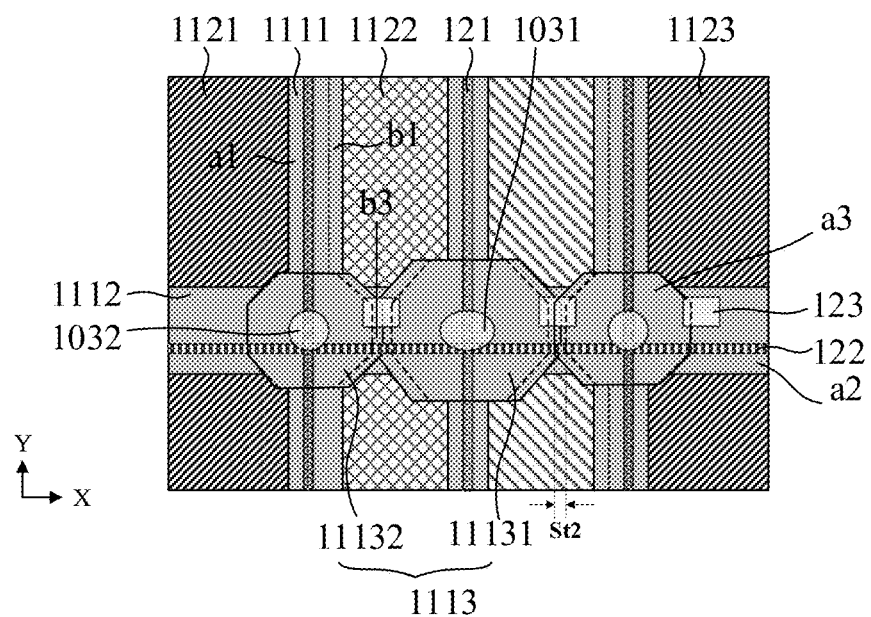
FIG. 10a is a schematic diagram of a partial planar structure of a display panel according to an exemplary embodiment of the present disclosure.

In an exemplary implementation mode, as shown in FIGS. 6a, 6c, and 10a, the first substrate 11 is further provided with a first alignment layer 113 and multiple support structures 103. The black matrix layer 111 and of the multiple color resistance elements 112 are located between the first alignment layer 113 and the first base substrate 1101, and the support structures 103 are disposed on a side of the first alignment layer 113 close to the second substrate 12.

The black matrix layer may further include multiple third body structures a3 corresponding to the multiple support structures 103, at least one third body structure a3 is provided with a third compensation structure b3, and the third compensation structure b3 is located on one side of the third body structure a3 in the fourth direction W in the curved surface where the first substrate 11 is located.

An orthographic projection of a support structure 103 on the second substrate 12 is within a range of orthographic projections of the third body structure a3 and the third compensation structure b3 on the second substrate 12. There is an overlapping region between the third body structure a3 and the first body structure a1. A size of the third body structure a3 and the third compensation structure b3 along the fourth direction W is larger than a size of the first body structure a1 and the first compensation structure b1 along the fourth direction W.

In an exemplary implementation mode, a size of the third compensation structure a3 along the fourth direction W is set in a same manner as a size of the first compensation structure a1 along the fourth direction W in a curved surface where the display panel is located. That is, the size of the third compensation structure b3 along the fourth direction W is set according to at least one of sizes of the first base substrate 1101 and the second base substrate 1201 along the bending direction of the display panel, sizes of the first substrate 11 and the second substrate 12 along the second direction Y, sizes of the first substrate 11 and the second substrate 12 along the fourth direction W, and a radius of curvature of the display panel. The radius of curvature of the display panel is a radius of curvature of the curved surface where the display panel is located.

In an exemplary implementation mode, as shown in FIGS. 6a, 6c, and 10a, the display panel is bent toward a side of the second substrate 12 away from the first substrate 11, and in the fourth direction W, in any set of a third body structure a3 and a third compensation structure b3, the third compensation structure b3 is located between the third body structure a3 and a first center line; wherein the first center line is a center line of the display panel extending along the second direction Y in the curved surface where the display panel is located.

Figure 7A:
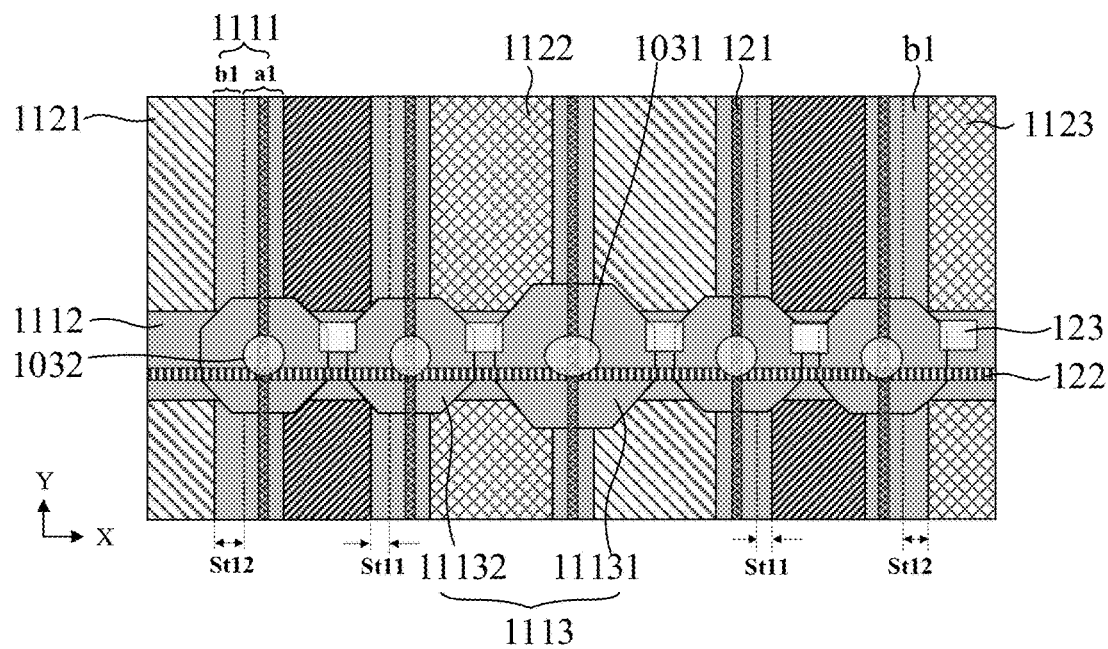
FIG. 7a is a schematic diagram of a partial planar structure of a display panel according to an exemplary embodiment of the present disclosure.
Figure 7B:
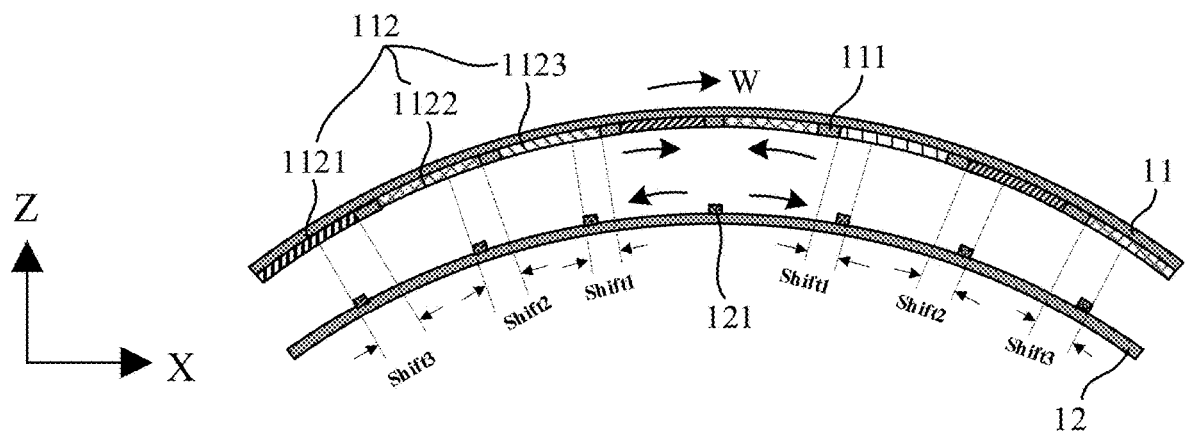
FIG. 7b is a schematic diagram of a cross-sectional structure of a display panel.
Figure 7C:
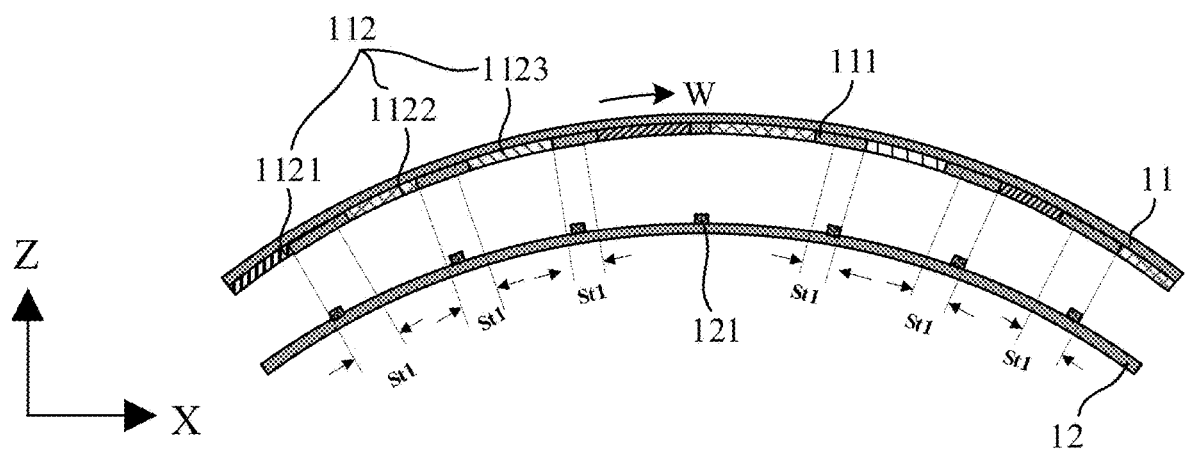
FIG. 7c is a schematic diagram of a cross-sectional structure of a display panel according to an exemplary embodiment of the present disclosure.
Figure 10B:
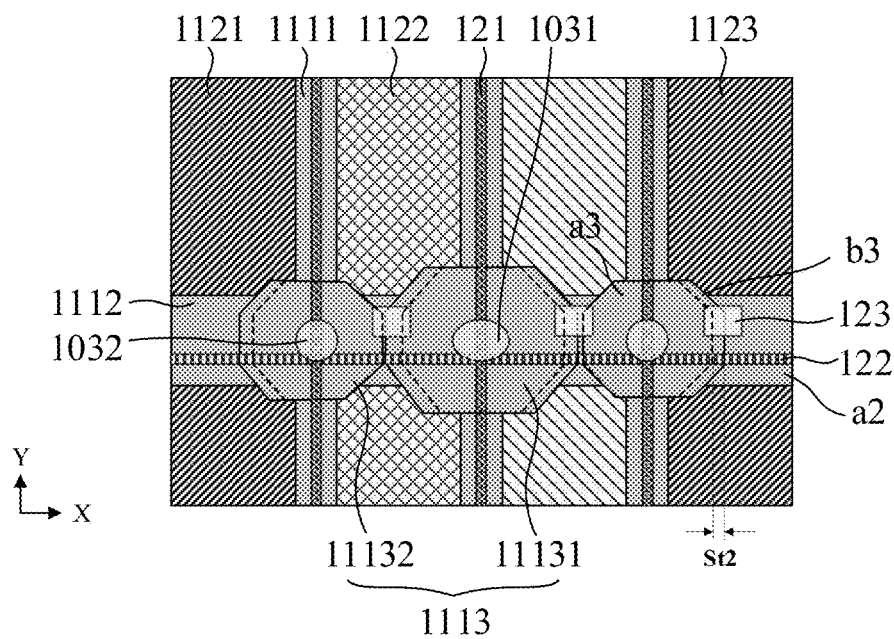
FIG. 10b is a schematic diagram of a partial planar structure of a display panel according to an exemplary embodiment of the present disclosure.

In an exemplary implementation mode, as shown in FIGS. 7a, 7c, and 10b, the display panel is bent toward a side of the first substrate 11 away from the second substrate 12, and in the fourth direction W, in any set of a third body structure a3 and a third compensation structure b3, the third body structure a3 is located between the third compensation structure b3 and a first center line, wherein the first center line is a center line of the display panel extending along the second direction Y in the curved surface where the display panel is located.

In the embodiment of the present disclosure, by providing a third compensation structure b3 on one side of a third body structure a3, in a state in which the display panel is bent, a support structure 103 on the display panel may be shielded by a corresponding third body structure a3 and a third compensation structure b3, thereby avoiding a phenomenon of light leakage or color crossover caused by misalignment of the first substrate 11 and the second substrate 12 due to bending of the display panel.

In an exemplary implementation mode, as shown in FIGS. 10a and 10b, multiple second signal lines 122 and vias 123 are further provided on a side of the second base substrate 1201 close to the first substrate 11, and the second signal lines 122 extend along the fourth direction W in the curved surface where the second substrate 12 is located and are arranged along the second direction Y.

The black matrix layer 111 may further include multiple second body structures a2 corresponding to the multiple second signal lines 122. The multiple second body structures a2 extend along the fourth direction W and are arranged along the second direction Y in the curved surface where the first substrate 11 is located, and are arranged along the fourth direction W.

Orthographic projections of the multiple second signal lines 122 and the vias 123 on the second substrate 12 are within a range of orthographic projections of corresponding second body structures a2 on the second substrate 12.

There is an overlapping region between a first body structure a1, a second body structure a2, and a third body structure a3.

Figure 9A:
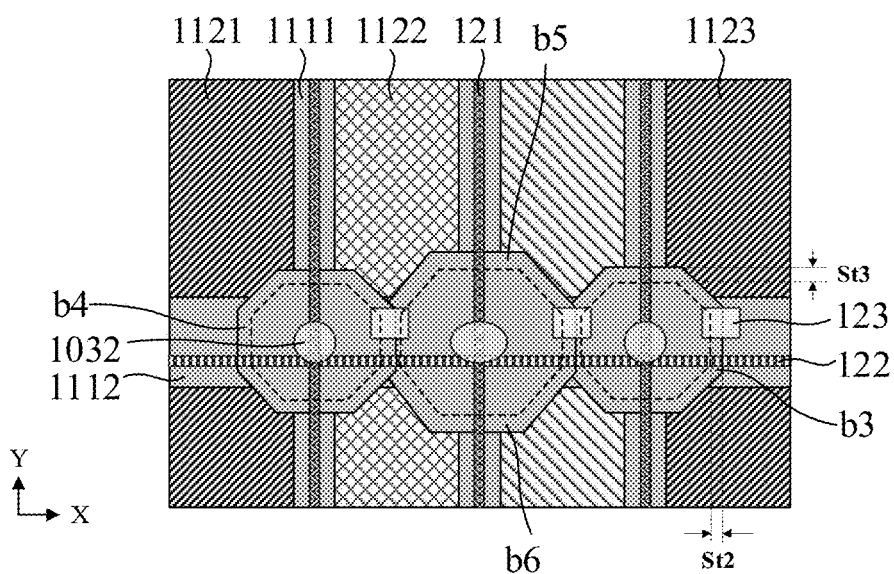
FIG. 9a is a schematic diagram of a partial planar structure of a display panel according to an exemplary embodiment of the present disclosure.
Figure 9B:
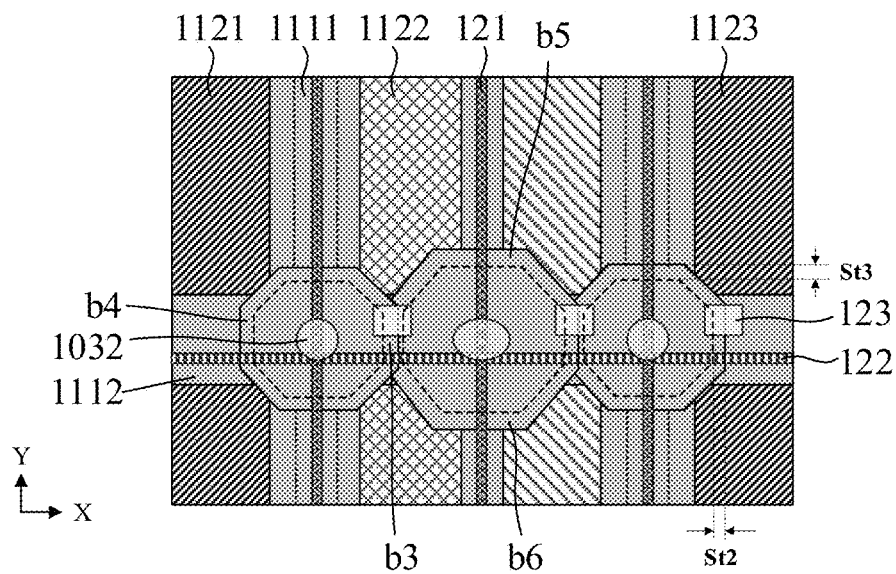
FIG. 9b is a schematic diagram of a partial planar structure of a display panel according to an exemplary embodiment of the present disclosure.

In an exemplary implementation mode, as shown in FIG. 9, the black matrix layer 111 may further include a fourth compensation structure b4, and the fourth compensation structure b4 and a third compensation structure b3 are disposed symmetrically with respect to a center line of the third body structure a3 extending along the second direction Y.

In an exemplary implementation mode, as shown in FIG. 9, the black matrix layer 111 may further include a fifth compensation structure b5 and a sixth compensation structure b6, and the fifth compensation structure b5 and the sixth compensation structure b6 are disposed symmetrically with respect to a center line of a third body structure a3 extending along the fourth direction W. In a structure shown in FIG. 9, the third body structure a3 may be provided with a third compensation structure b3 to a sixth compensation structure b6, so that the support structure 103 may be completely shielded by the third body structure a3 and the third compensation structure b3 to the sixth compensation structure b6. In a case where an alignment layer on the first substrate 11 or the second substrate 12 is scratched by the support structure 103, abnormal display of a liquid crystal layer between the first substrate 11 and the second substrate 12 caused by abnormal alignment usually occurs in a region where the alignment layer is scratched. Through the third body structure a3 on the black matrix layer and the third compensation structure b3 to the sixth compensation structure b6 that are disposed around the third body structure a3, a region of abnormal display caused by scratching the alignment layer by the support structure 103 may be shielded, thereby a problem of abnormal display of the display panel caused by scratching the alignment layer by the support structure 103 may be avoided as much as possible.

In the structure shown in FIG. 9, St2 is a size of the third compensation structure b3 and the fourth compensation structure b4 along the fourth direction, and St3 is a size of the fifth compensation structure b5 and the sixth compensation structure b6 along the second direction Y.

In an exemplary implementation mode of the present disclosure, multiple first black matrix structures 1111, multiple second black matrix structures 1112, and multiple third black matrix structures 1113 may be provided on the black matrix layer 111. Any one of the first black matrix structures 1111 may be composed of the first body structure a1 and the first compensation structure b1 disposed on one side of the first body structure; or, any one of the first black matrix structures 1111 may be composed of the first body structure a1, the first compensation structure b1, and the second compensation structure b2; any one of the second black matrix structures 1112 may be composed of the second body structure a2; any one of the third black matrix structures 1113 may be composed of the third body structure a3 and third compensation structure b3 to the sixth compensation structure b6 disposed around the third body structure.

In an exemplary implementation mode, the multiple first black matrix structures 1111, the multiple second black matrix structures 1112, and the multiple third black matrix structures 1113 may be of an integrally formed structure.

Figure 11:
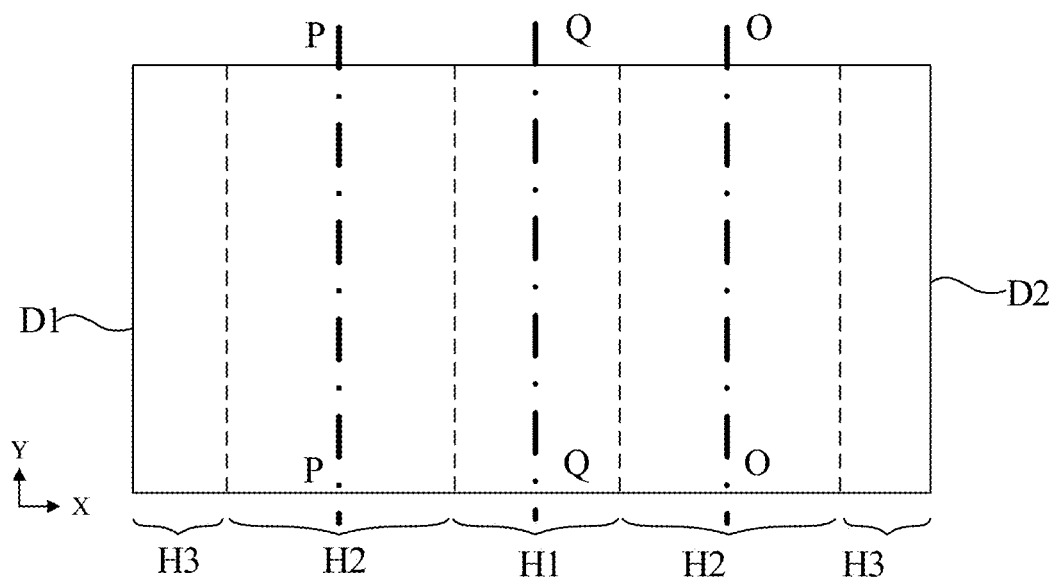
FIG. 11 is a schematic diagram of a planar structure of region division of a display panel according to an exemplary embodiment of the present disclosure.
Figure 12:
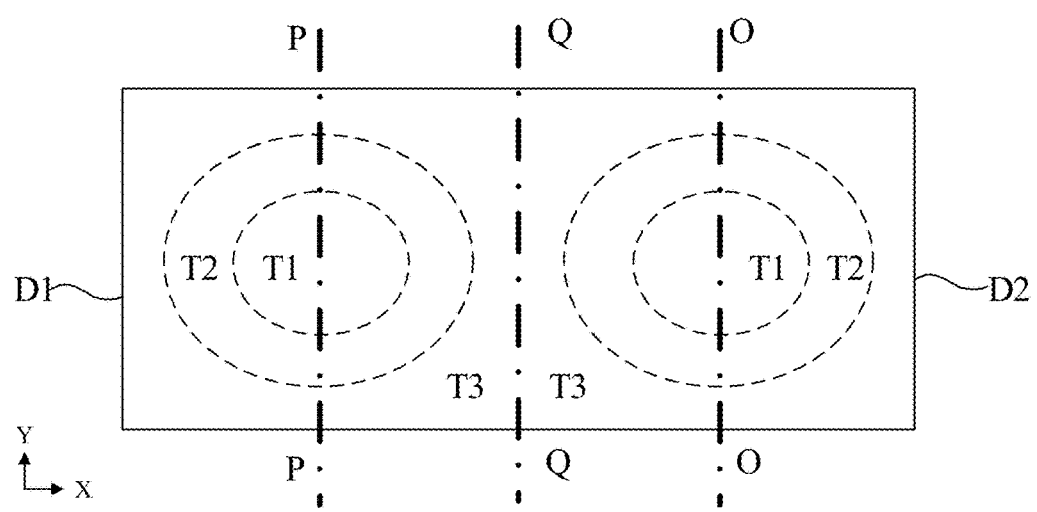
FIG. 12 is a schematic diagram of a planar structure of region division of a display panel according to an exemplary embodiment of the present disclosure.

In an exemplary implementation mode, as shown in FIGS. 1c, 11, and 12, the display panel includes a first side D1 and a second side D2 oppositely disposed along the fourth direction W. On the curved surface where the display panel is located, between the first center line Q-Q and the first side D1, sizes of first compensation structures b1 along the fourth direction W gradually decrease from a first compensation structure b1 at a position close to a third center line P-P to a first compensation structure b1 at a position away from the third center line P-P; between the first center line Q-Q and the second side D2, from a first compensation structure b1 at a position close to a fourth center line O-O to a first compensation structure b1 at a position away from the fourth center line O-O, sizes of first compensation structures b1 along the fourth direction W gradually decrease.

The third center line P-P is a center line of the display panel extending along the second direction between the first center line Q-Q and the first side D1, and the fourth center line O-O is a center line of the display panel extending along the second direction Y between the first center line Q-Q and the second side D2.

As shown in FIG. 6b, in a case where a first body structure a1 is not provided with a first compensation structure b1, in a region of the display panel between the first center line Q-Q and the first side D1, from a misalignment amount Shift at a position close to the third center line P-P to a misalignment amount Shift at a position away from the third center line P-P, sizes of misalignment amounts along the fourth direction gradually decrease. For example, both of a misalignment amount Shift2 and a misalignment amount Shift are located between the third center line P-P and the first center line Q-Q, and a size of the misalignment amount Shift2 along the fourth direction W is larger than a size of the misalignment amount Shift1 along the fourth direction W (in the fourth direction W, the misalignment amount Shift2 is located between the third center line P-P and the misalignment amount Shift1). Accordingly, in a region of the display panel between the first center line Q-Q and the first side D1, from a first compensation structure b1 at a position close to the third center line P-P to a first compensation structure b1 at a position away from the third center line P-P, sizes of first compensation structures b1 along the fourth direction gradually decrease. For example, as shown in FIG. 6c, a size of a compensation amount St12 of a first compensation structure b1 along the fourth direction W is larger than a size of a compensation amount St11 of a first compensation structure b1 along the fourth direction W (the compensation amount St12 is located between the third center line P-P and the compensation amount St11).

In an exemplary implementation mode, in the curved surface where the display panel is located, the display panel may be divided into multiple regions along the fourth direction W, the multiple regions include one first region H1 and two k-th regions Hk, wherein 2≤k≤N, and N is a positive integer greater than or equal to 2, and two regions Hk corresponding to any value of k are symmetrically disposed with respect to the first center line along the fourth direction W. Multiple first compensation structures b1 located in the first region H1 have a same size along the fourth direction W, and multiple first compensation structures b1 located in regions Hk corresponding to a same value of k have a same size along the fourth direction W. In an exemplary implementation mode, as shown in FIG. 11, N=3, multiple regions include one first region H1, two second regions H2, and two third regions H3, wherein the first region H1 is disposed symmetrically with respect to the first center line Q-Q along the fourth direction W, the two second regions H2 are disposed symmetrically with respect to the first center line Q-Q along the fourth direction W, and the two third regions H3 are disposed symmetrically with respect to the first center line Q-Q along the fourth direction W. In an exemplary implementation mode, in a display panel located between a first center line Q-Q and a first side D1, a first region H1 and a third region H3 are disposed symmetrically with respect to a third center line P-P along a fourth direction W, and a second region H2 is disposed symmetrically with respect to the third center line P-P along the fourth direction W. In a display panel located between the first center line Q-Q and a second side D2, a first region H1 and a third region H3 are disposed symmetrically with respect to a fourth center line O-O along the fourth direction W, and a second region H2 is disposed symmetrically with respect to the fourth center line O-O along the fourth direction W.

In an exemplary implementation mode, in divided regions shown in FIG. 11, on the display panel where the first center line Q-Q is close to the first side D1, on a same side of the third center line P-P, from a first compensation structure b1 in a region close to the third center line P-P to a first compensation structure b1 in a region away from the third center line P-P, sizes of first compensation structures b1 along the fourth direction W gradually decrease; on the display panel where the first center line Q-Q is close to the second side D2, on a same side of the fourth center line O-O, from a first compensation structure b1 in a region close to the fourth center line O-O to a first compensation structure b1 in a region away from the fourth center line O-O, sizes of first compensation structures b1 along the fourth direction W gradually decrease.

In an exemplary implementation mode, in the divided regions shown in FIG. 11, on the display panel where the first center line Q-Q is close to the first side D1, on a same side of the third center line P-P, from a third compensation structure b3 in a region close to the third center line P-P to a third compensation structure b3 in a region away from the third center line P-P, sizes of third compensation structures b3 along the fourth direction W gradually decrease; on the display panel where the first center line Q-Q is close to the second side D2, on a same side of the fourth center line O-O, from a third compensation structure b3 in a region close to the fourth center line O-O to a third compensation structure b3 in a region away from the fourth center line O-O, sizes of third compensation structures b3 along the fourth direction W gradually decrease.

In an exemplary implementation mode, in the curved surface where the display panel is located, each of two sides of the first center line Q-Q is divided into N-2 concentric annular regions. A region located at a center position inside an annular region is a first region T1, and a region located at a periphery of the annular region is an N-th region Tn, and there are two J-th regions for any J-th region TJ on the display panel, a value of J is 1 to N. The two J-th regions TJ are located on both sides of the first center line Q-Q and two J-th regions TJ are symmetrical with respect to the first center line in the fourth direction W. Any J-th region TJ is symmetrical with respect to a second center line, and the second center line is a center line extending along the fourth direction W of the display panel. Multiple first compensation structures b1 located at a position of the first region T1 have a same size along the fourth direction W. Multiple first compensation structures b1 located in a region TJ corresponding to a same value of J have a same size along the fourth direction W. In an exemplary implementation mode, as shown in FIG. 12, N=3, multiple regions include two first regions T1, two second regions T2, and two third regions T3. A second region T2 is an annular region, a first region T1 is located at a center position of the annular region of the second region T2, and a third region T3 is located at a peripheral region of the annular region of the second region T2.

In an exemplary implementation mode, on the curved surface where the display panel is located, on a same side of the first center line Q-Q, from a first compensation structure b1 in a region close to a center position of an annular region to a first compensation structure b1 in a region away from a center position of an annular region, sizes of first compensation structures b1 along the fourth direction W gradually decrease.

In an exemplary implementation mode, on the display panel on a side of the first center line Q-Q close to the first side D1, from a third compensation structure b3 in a region close to the third center line P-P to a third compensation structure b3 in a region away from the third center line P-P, sizes of third compensation structures b3 along the fourth direction W gradually decrease; on the display panel on a side of the first center line Q-Q close to the second side D2, from a third compensation structure b3 in a region close to the fourth center line O-O to a third compensation structure b3 in a region away from the fourth center line O-O, sizes of third compensation structures b3 along the fourth direction W gradually decrease.

In an exemplary implementation mode, on the curved surface where the display panel is located, on a same side of the first center line, from a third compensation structure b3 and a fourth compensation structure b4 in a region close to a center position of an annular region to a third compensation structure b3 and a fourth compensation structure b4 in a region away from the center position of the annular region, sizes of third compensation structures b3 and fourth compensation structures b4 along the fourth direction W gradually decrease.

In an implementation mode of the present disclosure, sizes of the first compensation structure b1 to the fourth compensation structure b4 along the fourth direction W may be set in a same manner. For example, all of b1 to b4 are set according to at least one of a size of the first base substrate 1101 and the second base substrate 1201 along the bending direction, a size of the first substrate 11 and the second substrate 12 along the second direction Y, a size of the first substrate 11 and the second substrate 12 along the fourth direction W, and a radius of curvature of the display panel.

In an exemplary implementation mode, on the curved surface where the display panel is located, on a same side of the first center line Q-Q, from a second compensation structure b2 in a region close to a center position of an annular region to a second compensation structure b2 in a region away from a center position of an annular region, sizes of second compensation structures b2 along the fourth direction W gradually decrease.

In an implementation mode of the present disclosure, a compensation structure is disposed on the first body structure a1, the second body structure a2, and the third body structure a3, so that a phenomenon of light leakage and color resistance color crossover caused by misalignment of the first substrate 11 and the second substrate 12 after the display panel is bent may be avoided, meanwhile, a light leakage degree of the display panel may be reduced to a certain extent when the display panel is in a dark state.

In an implementation mode of the present disclosure, in the curved display panel, an orthographic projection of a center line position of the first black matrix structure 1111 (including the first body structure a1 and the first compensation structure b1) along a the second direction Y on the first substrate 11 may be overlapped with an orthographic projection of the first signal line 121 on the first substrate 11. An orthographic projection of a center position of the third black matrix structure 1113 (including the third body structure a3 and the third compensation structure) on the first substrate 11 may be overlapped with an orthographic projection of a center line position of the support structure 103 on the first substrate.

Before the display panel is bent, an orthographic projection of the support structure 103 on the first substrate 11 may be located in a central region of an orthographic projection of the third body structure a3 on the first substrate 11.

In an embodiment of the present disclosure, before preparing the curved display panel, a curved surface simulation model may be established through a simulation software (such as a software of Ansys workbench) to simulate the display panel. A misalignment amount between the first body structure a1 on the first substrate 11 and the data signal line 121 on the second substrate 12 is simulated, and the first body structure a1 is compensated according to the simulated misalignment amount. In an embodiment of the present disclosure, a misalignment amount of an actual product may be measured by actually fabricating a curved display panel. As shown in FIG. 2a, for the display panel with a curved surface structure, distribution of misalignment amounts may be simulated by simulating a curved surface model, and the color film substrate 11, the array substrate 12, and a sealant 101 in the display panel and a fixed axis H for determining a bending center position of the display panel may be simply simulated through the curved surface simulation model. The radius of curvature R of the display panel is calculated through a displacement amount loaded in a third direction Z, as shown in FIG. 2b, and a relationship between the displacement amount M in the third direction Z and the radius of curvature R may be expressed through a following formula.

$$M = R - R * \cos((L/2)/R)$$

Among them, L is a length of the display panel along the fourth direction W, R is the radius of curvature, M is a displacement amount in the third direction Z, and a value of an angle F is (L/2)/R.

In an embodiment of the present disclosure, the displacement amount M loaded in the third direction Z may be a distance between a center position of the curved display panel and a position of a midpoint of a line connecting two ends of the curved display panel.

Figure 2C:
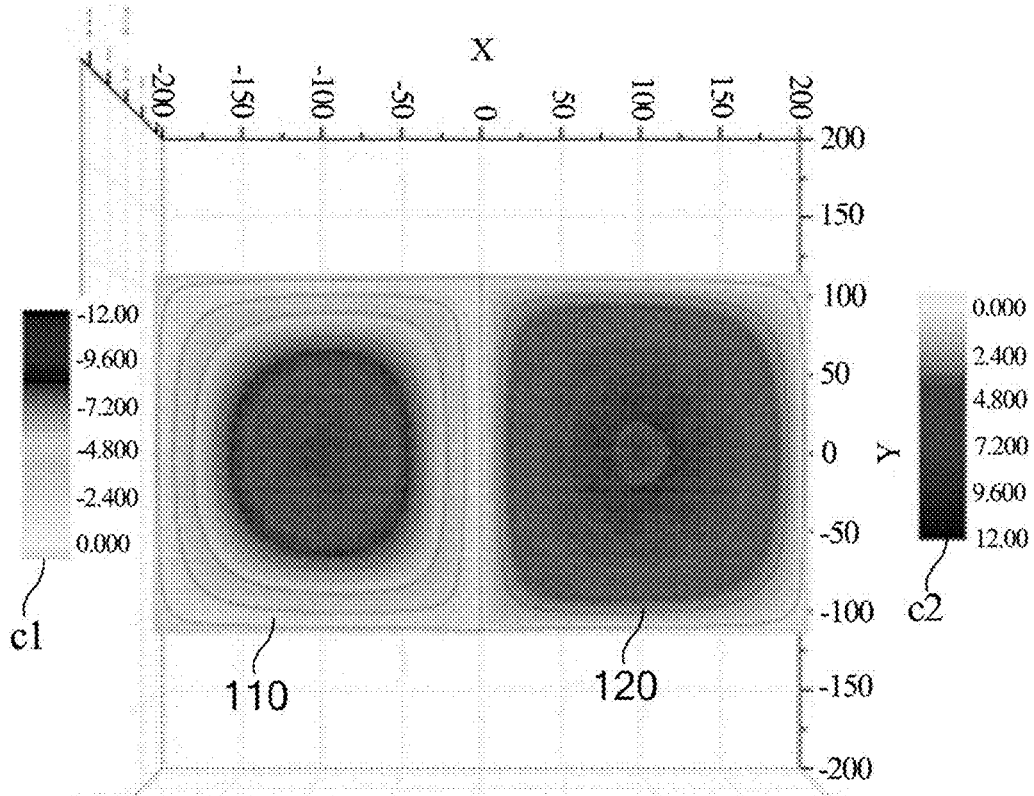
FIGS. 2c and 2d are diagrams showing distribution of misalignment of a simulated display panel according to an exemplary implementation mode of the present disclosure.
Figure 2D:
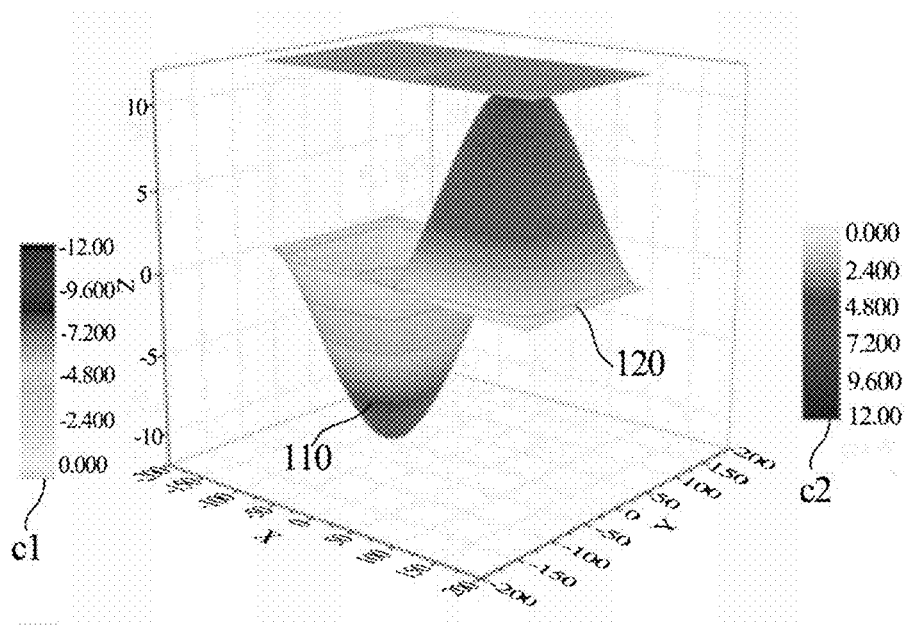

In an embodiment of the present disclosure, after the display panel is bent (in FIG. 2b, the display panel is bent along a direction opposite to the third direction Z), a displacement amount M is generated in a bending direction, and misalignment is generated between the color film substrate 11 and the array substrate 12 in the display panel, wherein a misalignment amount shift=a position of the color film substrate−a position of the array substrate, as shown in FIGS. 2c and 2d, which are distribution diagrams of misalignment amounts generated by the color film substrate 11 and the array substrate 12 observed from different viewing angles. In different positions in the display panel, the misalignment amount shift are different in dimension, wherein shade of a color of c1 only represents different shifts or misalignment amounts (i.e., misalignment amounts between an upper substrate and a lower substrate in a region of the display panel between the first center line Q-Q and the first side D1) located on a left side of a center line of the display panel extending along the second direction Y, and shade of a color of c2 only represents different shifts or misalignment amounts (i.e. misalignment amounts generated by upper and lower substrates in a region of the display panel between the first center line Q-Q and the second side D2) located on a right side of the center line of the display panel extending along the second direction Y. In FIGS. 2c and 2d, 110 represents distribution of misalignment amounts located on the left side of the center line of the display panel along the second direction Y (i.e., distribution of misalignment amounts between the upper substrate and the lower substrate in the region of the display panel between the first center line Q-Q and the first side D1), and 120 represents distribution of misalignment amounts located on the right side of the center line of the display panel along the second direction Y (i.e., distribution of misalignment amounts between the upper substrate and the lower substrate in the region of the display panel between the first center line Q-Q and the second side D2). The simulated misalignment amount may be close to or the same as a size of the first compensation structure b1 along the fourth direction W.

In an embodiment of the present disclosure, during a bending process of the display panel, a phase difference is generated through stress birefringence of the color film substrate 11 and the array substrate 12, adding an influence of anisotropy characteristics of liquid crystal, light leakage often occurs. The light leakage may be evaluated through a transmittance in a dark state, and may be obtained through a following formula.

$$T \propto \left(\frac{2\pi}{\lambda} * SOC * t * \tau_{xy}\right)^2$$

Among them, $\tau_{xy}$ represents a shear force inside the color film substrate 11 and the array substrate 12 under an action of an external force, t represents a thickness of the color film substrate 11 and the array substrate 12 (which may be a size of the first substrate 11 and the second substrate 12 along a bending direction), SOC represents a photoelastic coefficient of the color film substrate 11 and the array substrate 12, and T represents a light leakage degree of the display panel, and the light leakage degree T is positively related to a square of a thickness of a substrate and a square of the shear force $\tau_{xy}$.

Figure 2E:
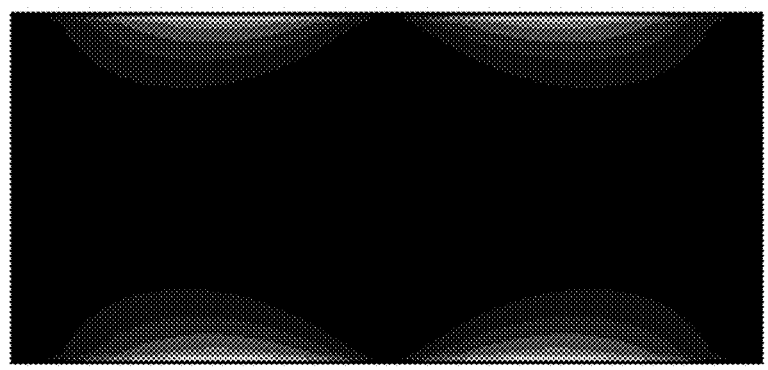
FIG. 2e is a schematic diagram of light leakage of a curved display panel.

In an exemplary implementation mode, the light leakage degree T may be evaluated through distribution of the square of the shear force $\tau_{xy}$ and the light leakage degree T is positively related to the distribution of the square of the shear force $\tau_{xy}$, as shown in FIG. 2e.

In an embodiment of the present disclosure, in a simulated model, the color film substrate 11 may be referred to as an upper substrate and the array substrate 12 may be referred to as a lower substrate; wherein a base substrate in the upper substrate and the lower substrate may be referred to as glass. In the simulated model, the upper substrate may be simplified into a model with only the above first base substrate 1101 and the lower substrate may be simplified into a model with only the above second base substrate 1201.

A simulation result of the misalignment amount shift of the upper substrate and the lower substrate after the curved display panel is bent is described in detail below with reference to FIGS. 2a to 2d.

(1) Since a periphery of the display panel is fixed through the sealant 101, the misalignment amount shift between the upper substrate and the lower substrate is divided for left and right sides of the fixed axis H (a bending center position, or may be a position of the first center line Q-Q) in the first direction X, shifting to both sides of the fixed axis H, that is, shifting from the fixed axis H along an opposite direction of the first direction X and shifting from the fixed axis H along the first direction X, as shown in FIGS. 2a and 2c. A dimension of a misalignment amount after bending may be a size of the above first compensation structure b1 along the fourth direction W.

(2) There is a first central axis (i.e. the third center line P-P) between the fixed axis H and the first side D1, and a second central axis (i.e. the fourth center line O-O) between the fixed axis H and the second side D2. Due to a fixing effect of the sealant 101 at the periphery of the display panel, misalignment amounts shift between the upper substrate and the lower substrate gradually decrease in the fourth direction W from a position close to the first central axis to a position close to the sealant 101 and the fixing axis H, and misalignment amounts shift between the upper substrate and the lower substrate gradually decrease in the fourth direction W from a position close to the second central axis to a position close to the sealant 101 and the fixing axis H. That is, misalignment amounts are distributed at unequal intervals on the display panel. A structure of distribution of misalignment amounts observed in a plane of XY in FIG. 2 is actually orthographic projections of the misalignment amounts along the fourth direction W on a plane where the first direction X and the second direction Y are located.

Figure 2F:
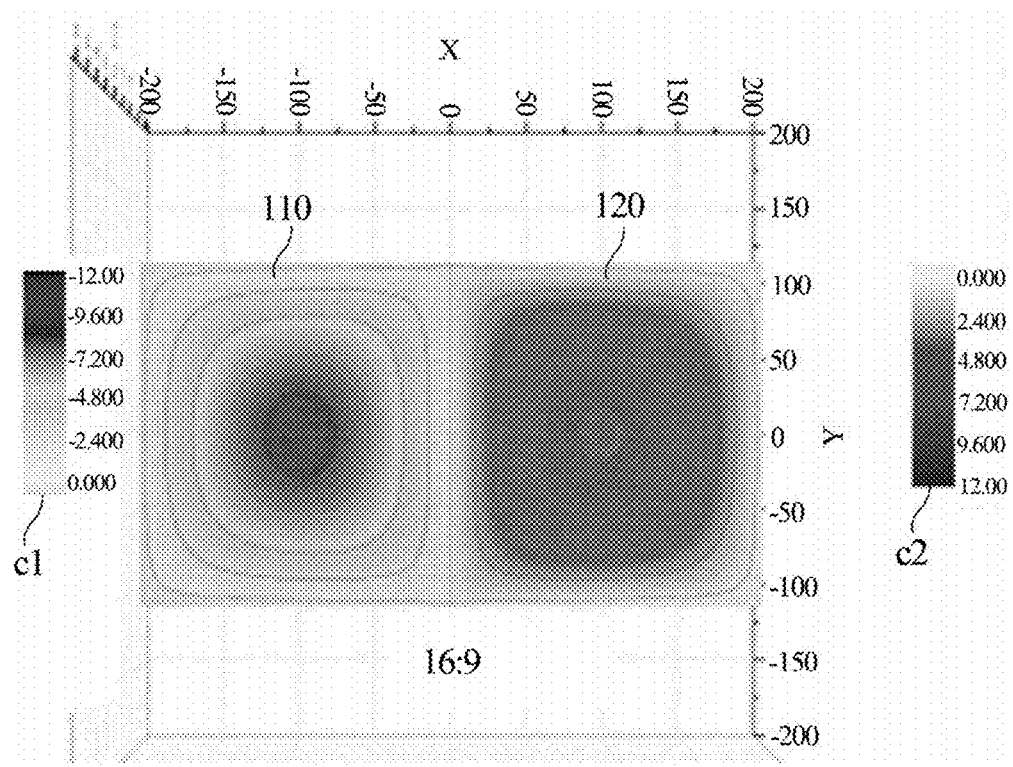
FIG. 2f is a diagram showing distribution of misalignment of a simulated display panel according to an exemplary implementation mode of the present disclosure.
Figure 2G:
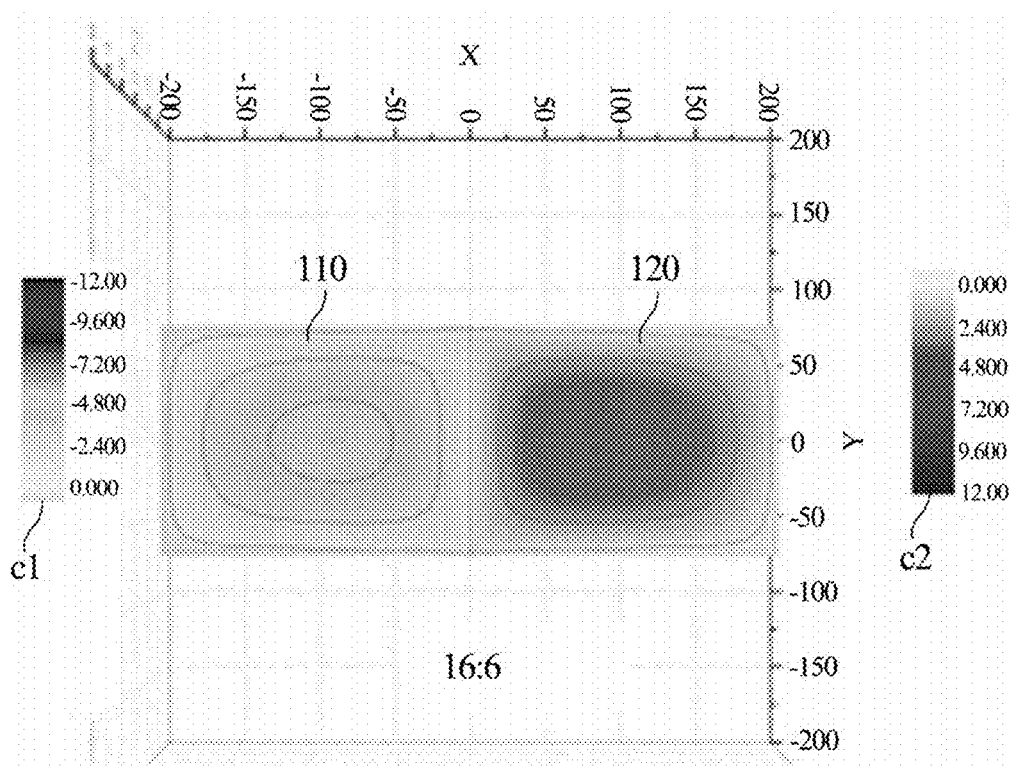
FIG. 2g is a diagram showing distribution of misalignment of a simulated display panel according to an exemplary implementation mode of the present disclosure.

(3) A maximum misalignment amount shift usually occurs at positions of the first central axis and the second central axis, and a misalignment amount varies slightly with a difference in a size ratio of the display panel. As shown in FIGS. 2f and 2g, display panels with different width-length ratios have differences in a misalignment amount. FIG. 2f is a diagram of distribution of misalignment amounts between an upper substrate and a lower substrate of a display panel with a simulated width-length ratio of 16:9, and FIG. 2g is a diagram of distribution of misalignment amounts between an upper substrate and a lower substrate of a display panel with a simulated width-length ratio of 16:6. It may be seen from simulation effects that a misalignment amount mount between the upper substrate and the lower substrate of the display panel with the width-length ratio of 16:9 is greater than a misalignment amount between the upper substrate and the lower substrate with the width-length ratio of 16:6.

Usually, a misalignment amount shift between an upper substrate and a lower substrate is generally related to a thickness of a substrate, a radius of curvature (which may be referred to as a bending radius), a size of a display panel, and a width-length ratio of the display panel. Factors related to the misalignment amount may also include materials of the substrate and a sealant. Following simulation is based on glass and the sealant of a same material for comparison with a maximum misalignment amount shift.

(1) In a case where a size, a width-length ratio, and a bending radius of the display panel all remain the same, the thicker the total thickness of the upper substrate and the lower substrate is, the larger the maximum misalignment amount shift is. As shown in FIG. 3a, a maximum amount shift has a linear relationship with a thickness of a substrate. In an exemplary implementation mode of the present disclosure, in a simulated relationship between the substrate thickness and the maximum misalignment amount in FIG. 3a, the size of the display substrate may be 14.6 inches and the radius of curvature of the display panel may be 780 mm.

(2) In a case where the size, the width-length ratio, and the substrate thickness of the display panel all remain the same (for example, the size of the display panel may be 12.3 inches, and thicknesses of the upper substrate and the lower substrate may all be 0.2 mm), the smaller the bending radius R (which may be referred to as the radius of curvature R) is, the larger the maximum misalignment amount shift is. As shown in FIG. 3b, the maximum misalignment amount shift is proportional to a displacement amount M along the third direction Z. In FIG. 3b, R5000 represents that the radius of curvature is 5000 mm, R3000 represents that the radius of curvature is 3000 mm, R2000 represents that the radius of curvature is 2000 mm, and R780 represents that the radius of curvature is 780 mm.

(3) In a case where the width-length ratio, the bending radius (i.e. the radius of curvature), and the substrate thickness of the display panel all remain the same (for example, the radius of curvature of the display panel is 780 mm, and the thicknesses of the upper substrate and the lower substrate are all 0.2 mm), the smaller the size of the display panel along the fourth direction W is, the smaller the substrate misalignment amount shift of the upper substrate and the lower substrate is, and the maximum misalignment amount shift has a linear relationship with a size of the display panel along the fourth direction. As shown in FIG. 3c, for a display panel with a radius of curvature of 780 mm, a substrate length L (the size of the display panel along the fourth direction W) is increased from 250 mm to about 550 mm (a corresponding size of the display panel is about 10 inches to about 22 inches), and the maximum misalignment amount shift has a linear relationship with the substrate length. In FIG. 3c, S11 is a relationship between the maximum misalignment amount and the substrate length in a case where a width-length ratio of a simulated display panel is W/L=55%. The maximum misalignment amount may be calculated through a following approximate formula: y=0.0364x+0.0131, wherein y represents the maximum misalignment amount and x represents the substrate length; S12 is a relationship between the maximum misalignment amount and the substrate length in a case where a width-length ratio of the simulated display panel is W/L=37%. The maximum misalignment amount may be calculated through a following approximate formula: y=0.0231x−0.1021, wherein y represents the maximum misalignment amount and x represents the substrate length.

(4) In a case where the bending radius (i.e., the radius of curvature) of the display panel and the substrate thickness remain the same (for example, a length of the display panel along the fourth direction W is 327.7 mm, the radius of curvature of the display panel is 780 mm, and the thicknesses of the upper substrate and the lower substrate are all 0.15 mm), the smaller the width-length ratio of the display panel is, the smaller the misalignment amount shift of the upper substrate and the lower substrate is. As shown in FIG.

3d, in a case where the width-length ratio W/L>10%, the maximum misalignment amount shift is basically linear with the width-length ratio W/L.

Based on the above simulation results, it may be approximately extended to different requirements and different situations to design the size, the bending radius (radius of curvature), and the substrate thickness of the display panel, so as to design a display panel that meets different requirements and different application scenarios.

Figure 4A:
FIG. 4a is a schematic diagram of light leakage of a curved display panel.
Figure 4B:
FIG. 4b is a schematic diagram of light leakage of a curved display panel with a special-shaped structure.

In an implementation mode of the present disclosure, for a display panel applied to a scenario with a special-shaped structure, such as a vehicle-mounted curved display, since it has a locally smaller width-length ratio, a misalignment amount shift of an upper substrate and a lower substrate of the display panel is generally smaller than that of a display panel with a normal shape, and light leakage degree is small. A 15.6-inch display panel (a radius of curvature of which is 780 mm, thicknesses of an upper substrate and a lower substrate are all 0.15 mm, a width of the display panel is W=128.2 mm, and a length of the display panel is L=373.8 mm) is taken as an example for description. In a case of using a non-special-shaped display panel, a maximum misalignment amount shift between an upper substrate and a lower substrate is 6.1 microns; in a case of using a special-shaped display panel, a maximum misalignment amount shift between an upper substrate and a lower substrate is 4.3 microns. For conventional vehicle-mounted pixels of 50 microns×150 microns, a Black Matrix (BM for short) is used for unilateral compensation, and an estimated aperture difference (which may be referred to as a transmittance) is 5%. A Black Matrix is used for bilateral compensation, and an estimated aperture difference is 10%. FIG. 4a shows a schematic diagram of distribution of light leakage of a 15.6-inch non-special-shaped display panel, and FIG. 4b is a schematic diagram of distribution light leakage of a 15.6-inch special-shaped display panel. FIGS. 4a and 4b may be schematic diagrams of light leakage formed under a same stepped gray scale. As may be seen from FIGS. 4a and 4b, for display panels with a same size, a light leakage degree in a case where a special-shaped design is adopted is weaker than that of a display panel with a non-special-shaped design, such that a display effect of a display panel with the special-shaped design is better than that of the display panel with the non-special-shaped design due to a weak light leakage degree.

Figure 5A:
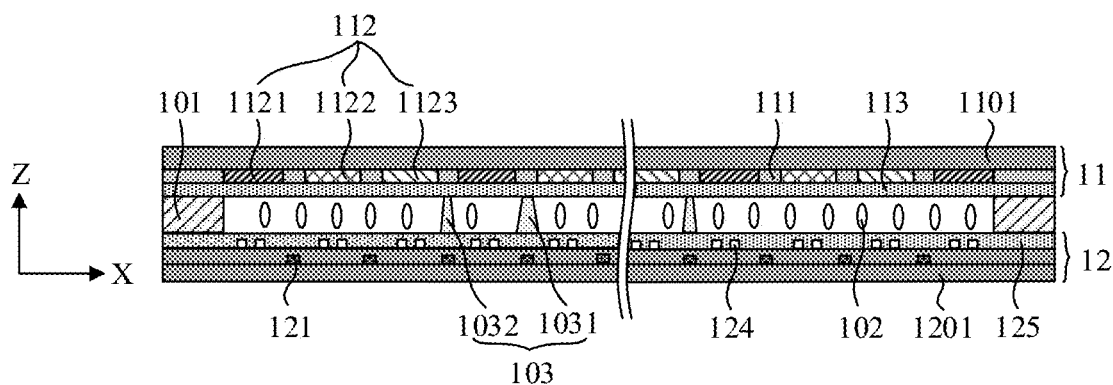
FIG. 5a is a schematic diagram of a cross-sectional structure of a display panel.
Figure 5B:
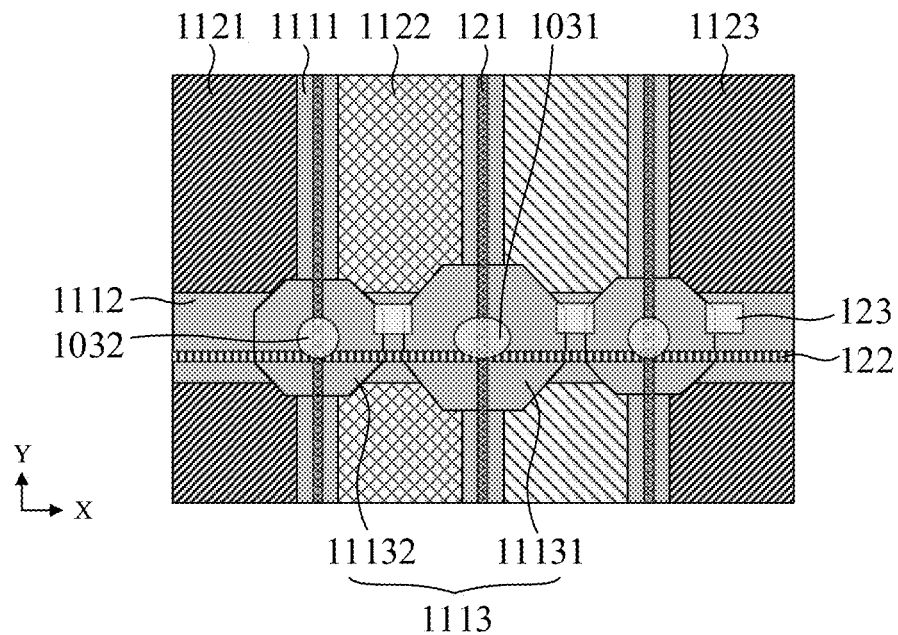
FIG. 5b is a schematic diagram of a partial planar structure of a display panel in an unbent state.

In an exemplary implementation mode, for a non-curved liquid crystal display panel, as shown in FIGS. 5a and 5b, the color film substrate 11 may include a first base substrate 1101, and a black matrix layer 111 (BM), a color resistance element 112, and a first alignment layer 113 covering the black matrix layer 111 and the color resistance element 112 that are disposed on the first base substrate 1101, wherein the color resistance element 112 may include a first color resistance element 1121, a second color resistance element 1122, and a third color resistance element 1123, the black matrix layer 111 may include a first black matrix structure 1111, a second black matrix structure 1112, and a third black matrix structure 1113, the array substrate 12 may include a second base substrate 1201, and a data signal line 121 (SD), a gate signal line 122 (Gate), a via 123 (Via hole), a pixel electrode 124, and a second alignment layer 125 covering the pixel electrode 124 that are disposed on the second base substrate 1201. A liquid crystal layer 102 and a support structure 103 (PS) are provided between the color film substrate 11 and the array substrate 12, and the support structure 103 may include a main support structure 1031 (Main PS) and a subordinate support structure 1032 (Sub PS). In an implementation mode of the present disclosure, the main support structure 1031 (Main PS) is disposed on the upper substrate and the lower substrate. In a normal state, the main support structure 1031 may contact the lower substrate to support the upper substrate and the lower substrate, while the subordinate support structure 1032 does not contact the lower substrate in a normal state. After the display panel is pressed, the subordinate support structure 1032 may contact the lower substrate to play a subordinate support role.

In an embodiment of the present disclosure, a main function of the black matrix layer 111 is for light shielding and may be made of one or more of photoresin, black resin, and chromium material.

In an exemplary implementation mode, the first black matrix structure 1111 may be used for dividing pixels. Both of the first black matrix structure 1111 and the data signal line 121 extend along the second direction Y, and a size of the first black matrix structure 1111 along the fourth direction W is larger than a size of the data signal line 121 along the fourth direction W. An orthographic projection of the data signal lines 121 on the array substrate 12 falls within a range of an orthographic projection of the first black matrix structure 1111 on the array substrate 12, and the orthographic projection of the first black matrix structure 1111 on the array substrate 12, along the fourth direction W, is symmetrical with respect to a center line, extending along the second direction Y, of the orthographic projection of the data signal line 121 on the array substrate 12. In a case of fluctuations in a process of preparing the display panel, a pixel aperture may remain unchanged, and poor display caused by color crossover at a large viewing angle may be reduced. Such a designing manner is adopted for the first black matrix structure 1111 and the data signal line 121, the size BM_Data of the first black matrix 1111 along the first direction X and the size SD CD of the data signal line 121 along the first direction X may have a following relationship.

$$BM\ Data \geq SD\ CD + 2 * \sqrt{\text{alignment fluctuation of upper and lower substrates}^2 + 2 * BM\ CD\ \text{unilateral fluctuation}^2}$$

Alignment of the upper substrate and the lower substrate (i.e., the color film substrate 11 and the array substrate 12) and unilateral fluctuation of the first black matrix structure 1111 will not affect a function of the black matrix layer 111 to divide pixels and avoid color crossover.

In an exemplary implementation mode, the second black matrix structure 1112 is used for shielding the gate signal line 122 (Gate) and the via 123 on the array substrate 12 (the array substrate 12 is further provided with a thin film transistor, and the via is a connection via between the thin film transistor and the pixel electrode 124). The second black matrix structure 1112 and the gate signal line 122 each extend along the fourth direction W, and orthographic projections of the gate signal line 122 and the via 123 on the array substrate 12 fall within a range of an orthographic projection of the second black matrix 1112 on the array substrate 12.

In an exemplary implementation mode, the third black matrix structure 1113 is used for shielding the support structure 103. The third black matrix structure 1113 may include a first sub black matrix structure 11131 used for shielding the main support structure 1031 (Main PS) and a second sub black matrix structure 11132 used for shielding the subordinate support structure 1032 (Sub PS), wherein an orthographic projection of the main support structure 1031 on the array substrate 12 falls within a range of an orthographic projection of the first sub black matrix structure 11131 on the array substrate 12, and an orthographic projection of the subordinate support structure 1032 on the array substrate 12 falls within the range of the orthographic projection of the first sub black matrix structure 11131 on the array substrate 12. In an exemplary implementation mode, a center position of the orthographic projection of the main support structure 1031 on the array substrate 12 coincides with a center position of the orthographic projection of the first sub black matrix structure 11131 on the array substrate 12, a center position of the orthographic projection of the subordinate support structure 1032 on the array substrate 12 coincides with the center position of the orthographic projection of the first sub black matrix structure 11131 on the array substrate 12, and both the support structure 103 and the third black matrix structure 1113 are of symmetrical structures along a center line extending along the fourth direction W. An expansion compensation is performed on the third black matrix structure 1113 with respect to the support structure 103 (the third body structure a3 is provided with the third compensation structure b3 to the sixth compensation structure b6), thereby the first alignment layer 113 (PI) and the second alignment layer 125 may be normally aligned, and poor light leakage caused by the support structure 103 scratching the second alignment layer 125 on one side of the array substrate 12 after an external force may be avoided.

The black matrix structure of the black matrix 111 in the curved display panel is compensated below, and following compensation modes are proposed from a compensation position and a compensation size (i.e., a size, along the fourth direction, of a compensation structure in the display panel), as shown in Table 1.

sides, and an influence of an aperture is small. Taking a display panel with a size of 14.6 inches (a pixel size 168.3 microns*168.3 microns) and a bending radius R of 780 mm as an example, compared with a compensation mode with both-side compensation of 7 microns of a black matrix structure BM, a pixel aperture ratio of a compensation mode with one-side compensation of 7 microns of a black matrix structure may be increased by 10%. In an exemplary implementation mode, an aperture ratio may be a ratio of an area of a light-transmissible portion of a pixel to a total area of the pixel, or, the aperture ratio may be a ratio between an area of a portion where light may pass through in a pixel after a portion shielded by the black matrix layer 111 and a tracing portion are removed from the pixel, and an area of the whole pixel, or the aperture ratio may be a ratio of a portion where light may pass through to an overall area of the pixel, in the overall area of the pixel.

Compensation modes of the first black matrix structure 1111 and the third black matrix structure 1113 will be described below.

(1) BM_Data Shift Direction Compensation-Asymmetry Compensation

As shown in FIGS. 6*a* to 6*c*, the display panel is bent toward a side of the second substrate 12 away from the first substrate 11. Before the display panel is bent (as shown in FIG. 6*a*), in a plane where the display panel is located, corresponding to any one of the first black matrix structures 1111, a first compensation structure b1 is provided on a side close to the first center line Q-Q, and a compensation amount is St1, and a compensation structure may not be provided on a side away from the first center line. FIG. 6*b* shows that in a case where the first compensation structure is not provided, after the display panel is bent, a misalignment amount shift is generated between each of the first black matrix structures 1111 and a corresponding signal line 121 along the fourth direction W on a side close to the first

TABLE 1

Black Matrix Compensation Mode

| | Compensation position | | | | |
|---|---|---|---|---|---|
| | BM_Data | | BM_PS | | |
| Compensation mode | Shift direction compensation - asymmetry | Simultaneous compensation on both sides - symmetry | Simultaneous compensation in X and Y directions | Shift X direction compensation | No compensation |
| After compensation | BM_Data + shift | BM_Data + 2 * shift | BM_PS (X&Y) + shift | BM_PS(X) + shift | BM_PS(X&Y) |
| Mode 1 | √ | — | √ | — | — |
| Mode 2 | — | √ | √ | — | — |
| Mode 3 | √ | — | — | √ | — |
| Mode 4 | — | √ | — | √ | — |
| Mode 5 | √ | — | — | — | √ |
| Mode 6 | — | √ | — | — | √ |

The first direction X shown in Table 1 represents an orthographic projection, in the first direction X, of the misalignment amount of the display panel along the fourth direction W.

Among the six compensation modes in Table 1, Mode 2 has a largest pixel aperture loss, and a relatively large coverage area of a compensation structure leads to a low aperture ratio, and Mode 5 has a smallest aperture loss (a relatively high aperture ratio), but a risk of light leakage is relatively high. For a display panel with a low Pixels Per Inch (PPI for short)<150, BM_Data is compensated on both center line, and the compensation amount St1 of the first compensation structure b1 along the fourth direction W in FIG. 6*a* is consistent with (equal or approximate) a corresponding misalignment amount shift along the fourth direction W in FIG. 6*b*. FIG. 6*c* shows a curved display panel formed by bending after the first compensation structure b1 is provided on a side of the first black matrix structure 1111 close to the first center line Q-Q. After the display panel is bent, an orthographic projection of the first signal line 121 on the first substrate 11 falls within a range of an orthographic projection of the first black matrix structure 1111 on the first substrate 11. In a case where the first compensation structure b1 is reasonably provided, an orthographic projection of a center line of the first signal line 121 extending along the second direction Y on the first substrate 11 is overlapped with an orthographic projection of a center line of the first black matrix structure 1111 extending along the second direction Y on the first substrate 11.

Figure 6D:
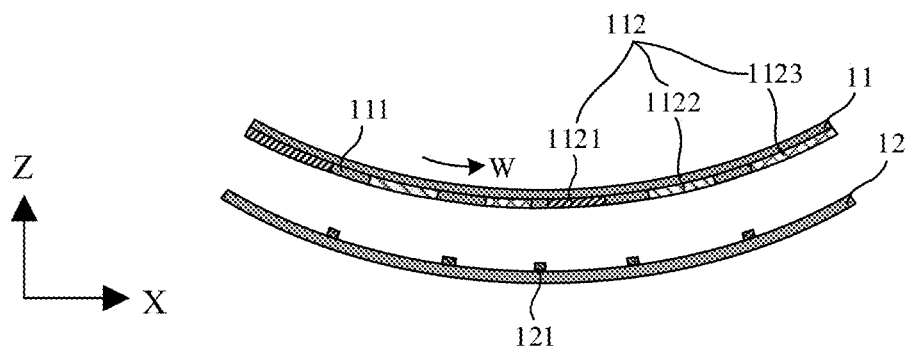
FIG. 6d is a schematic diagram of a cross-sectional structure of a display panel according to an exemplary embodiment of the present disclosure.

FIGS. 6b to 6d are schematic cross-sectional views after the display panel is bent, wherein in a structure shown in FIG. 6b, the first black matrix structure 1111 is not compensated before the display panel is bent, and in structures shown in FIGS. 6c and 6d, the first black matrix structure 1111 is compensated before the display panel is bent, and the compensation amount St1 is a size of the first compensation structure b1 along the fourth direction W.

As shown in FIGS. 7a to 7d, the display panel is bent along a side of the first substrate 11 away from the second substrate 12, the first compensation structure b1 is provided on a side of the first body structure a1 away from the first center line Q-Q, and a first compensation amount St1 is equal to or close to a corresponding misalignment amount Shift (as shown in FIG. 7b).

Figure 7D:
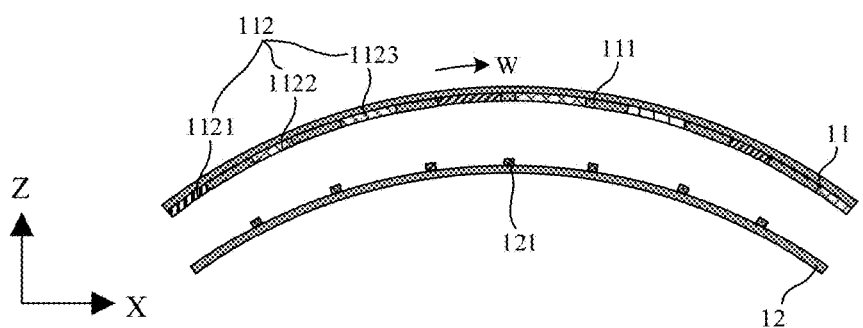
FIG. 7d is a schematic diagram of a cross-sectional structure of a display panel according to an exemplary embodiment of the present disclosure.

FIGS. 7b to 7d are schematic cross-sectional views after the display panel is bent, wherein in a structure shown in FIG. 7b, the first body structure a1 is not compensated before the display panel is bent, and in structures shown in FIGS. 7c and 7d, the first body structure a1 is compensated before the display panel is bent.

In compensation modes shown in FIGS. 6 and 7, the first compensation structure b1 is provided only on one side of the first body structure a1.

(2) Simultaneous Compensation on Both Sides of BM_Data-Symmetrical with Respect to the SD As shown in FIG. 8, before the display panel is bent, in the plane where the display panel is located, for any one of the first black matrix structures 1111 located on both sides of the first center line, both on one side close to the first center line and on one side away from the first center line, a first compensation amount St1 (that is, a size of the first compensation structure and the second compensation structure along the fourth direction) is compensated along the first direction X. That is, the first compensation structure b1 and the second compensation structure b2 are provided on both sides of the first body structure a1, as shown in FIG. 8.

(3) Simultaneous Compensation in BM_PS XY Direction

As shown in FIG. 9, before the display panel is bent, in a plane where the display panel is located, for any one of the third black matrix structures 1113, a second compensation amount St2 (a size of the third compensation structure b3 along the fourth direction W) is compensated along the first direction X on both a side away from the first center line and a side close to the first center line, a third compensation amount St3 (a size of the fifth compensation structure b5 and the sixth compensation structure b6 along the second direction Y) is compensated along the second direction Y on both a side away from the second center line and a side close to the second center line, wherein the second center line is a center line of the display panel extending along the first direction (extending along the fourth direction after the display panel is bent).

(4) BM_PS Shift Direction Compensation

As shown in FIG. 10, before the display panel is bent, in a plane where the display panel is located, a second compensation amount St2 is compensated for one side of any third black matrix structure 1113 along the first direction X. The second compensation amount St2 may be a size of the third compensation structure b3 along the first direction X before the display panel is bent and a size of the third compensation structure b3 along the fourth direction after the display panel is bent.

For the compensation modes (1)-(4) mentioned above, regions do not need to be distinguished for a dimension of a compensation amount, and all compensation positions are compensated according to a maximum misalignment amount, or each black matrix structure is compensated according to a misalignment amount of its own position. Another compensation mode is to divide the display panel into different regions according to a condition of distribution of misalignment amounts shift on the display panel after the display panel is bent, and a compensation amount of each region is substantially consistent with a misalignment amount of the region. For a specific compensation mode of dividing regions, reference may be made to the above description of compensation performed according to region division shown in FIGS. 11 and 12.

FIGS. 11 and 12 show compensation modes of dividing different regions. Due to different misalignment amounts for each region, a compensation amount of each black matrix structure will also be different, which usually results in inconsistent aperture ratios of the entire display panel, and thus lead to inconsistent brightness of the display panel in different regions. Brightness consistency of different regions may be achieved by adjusting backlight brightness of the display panel (for example, increasing a backlight current in a place with a large compensation amount). Or, a problem of inconsistent brightness in the display panel may be improved by adjusting the pixel electrode 124 (PITO) on the second substrate 12 in different regions (e.g., adjusting a size of the pixel electrode 124 in a same pixel along the fourth direction; in a case where there are multiple pixel electrodes 124 in a same pixel, a distance between the multiple pixel electrodes 124 along the fourth direction and sizes of the pixel electrodes 124 along the first direction may be adjusted simultaneously), or the problem of inconsistent brightness in the display panel is improved by a matching design for a liquid crystal cell thickness (e.g., for a region with a low aperture ratio, a film layer is added on a liquid crystal layer to reduce a transmittance, so that an overall transmittance of the display panel remains consistent). In an embodiment of the present disclosure, a problem of inconsistent brightness in different regions of the display panel may be improved by adopting one or more above modes of adjusting the pixel electrodes 124 in different regions, a matching design for the liquid crystal cell thickness, and adjusting backlight brightness of different regions.

An embodiment of the present disclosure also provides a display apparatus, which includes the display panel of any one of the aforementioned embodiments.

In an implementation mode of the present disclosure, the display apparatus may be an electronic device having a display function, such as a mobile phone, a computer, a television (TV), a medical monitoring device, and a vehicle-mounted central control device.

According to the display panel and the display apparatus provided in the embodiments of the present disclosure, a first compensation structure is disposed on one side of only one first body structure in a black matrix layer, so that an orthographic projection of a first signal line on a second substrate is located within a range of orthographic projections of a corresponding first body structure and a first compensation structure on the second substrate, and a phenomenon of color crossover of a curved display panel and light leakage of the display panel under an effect of a dark state picture is avoided to a large extent.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementation modes disclosed in the embodiments of the present disclosure are described above, contents are only implementation modes for facilitating understanding of the embodiments of the present disclosure, which are not intended to limit the embodiments of the present disclosure. Those of skill in the art to which the embodiments of the present disclosure pertain may make any modifications and variations in forms and details of implementation without departing from the spirit and scope of the embodiments of the present disclosure. Nevertheless, the scope of patent protection of the embodiments of the present disclosure shall still be subject to the scope defined by the appended claims.

The invention claimed is:

1. A display panel, comprising: a first substrate and a second substrate disposed oppositely to each other, wherein;
the first substrate and the second substrate are of a curved surface structure;
the first substrate comprises a first base substrate and a black matrix layer disposed on a side of the first base substrate closest to the second substrate;
the second substrate comprises a second base substrate and multiple first signal lines disposed on a side of the second base substrate closest to the first substrate, wherein the multiple first signal lines extend along a second direction and are arranged along a fourth direction, and the fourth direction intersects with the second direction in a curved surface where the second substrate is located;
the black matrix layer comprises multiple first body structures corresponding to the multiple first signal lines, and a first compensation structure is provided on one side of at least one first body structure of the multiple first body structures; in a curved surface where the first substrate is located, the at least one first body structure and the first compensation structure extend along the second direction and are arranged along the fourth direction, and the fourth direction intersects with the second direction in the curved surface where the first substrate is located;
an orthographic projection of any one of the first signal lines on the second substrate is located within a range of orthographic projections of a corresponding first body structure and a corresponding first compensation structure on the second substrate;
the display panel comprises a first side and a second side disposed oppositely to each other along the fourth direction, on a curved surface where the display panel is located, between a first center line and the first side, from the first compensation structure at a position closest to a third center line to the first compensation structure at a position farthest from the third center line, sizes of first compensation structures along the fourth direction gradually decrease; between the first center line and the second side, from the first compensation structure at a position closest to a fourth center line to the first compensation structure at a position farthest from the fourth center line, sizes of first compensation structures along the fourth direction gradually decrease; and the third center line is a center line of the display panel extending along the second direction between the first center line and the first side, and the fourth center line is a center line of the display panel extending along the second direction between the first center line and the second side.

2. The display panel according to claim 1, wherein the display panel is bent toward a side of the second substrate farthest from the first substrate, and in the fourth direction, for any set of the first body structure and the first compensation structure, the first compensation structure is located between the first body structure and a first center line; or, the display panel is bent toward a side of the first substrate farthest from the second substrate, and in the fourth direction, for any set of the first body structure and the first compensation structure, the first body structure is located between the first compensation structure and a first center line; wherein the first center line is a center line of the display panel extending along the second direction.

3. The display panel according to claim 1, wherein, in the curved surface where the display panel is located, the display panel is divided into multiple regions along the fourth direction, the multiple regions comprise one first region and two k-th regions, wherein 2≤k≤N, and N is a positive integer greater than or equal to 2, and two regions corresponding to any value of k are symmetrically disposed with respect to the first center line along the fourth direction;
sizes of multiple first compensation structures located in the first region along the fourth direction are the same, and sizes of multiple first compensation structures located in regions corresponding to a same value of k along the fourth direction are the same.

4. The display panel according to claim 3, wherein N=3, the multiple regions comprise one first region, two second regions, and two third regions, the first region is disposed symmetrically with respect to the first center line along the fourth direction, the two second regions are disposed symmetrically with respect to the first center line along the fourth direction, and the two third regions are disposed symmetrically with respect to the first center line along the fourth direction;
in the display panel located between the first center line and the first side, a first region and a third region are disposed symmetrically with respect to the third center line along the fourth direction, and a second region is disposed symmetrically with respect to the third center line along the fourth direction; in the display panel located between the first center line and the second side, a first region and a third region are disposed symmetrically with respect to the fourth center line along the fourth direction, and a second region is disposed symmetrically with respect to the fourth center line along the fourth direction.

5. The display panel according to claim 1, wherein in a curved surface where the display panel is located, each of two sides of a first center line is divided into N-2 concentric annular regions; a region located at a center position inside an annular region is a first region, and a region located at a periphery of the annular region is an N-th region, and there are two J-th regions for any J-th region on the display panel, a value of J is 1 to N; the two J-th regions are located on both sides of the first center line and the two J-th regions are symmetrical with respect to the first center line in the fourth direction W; any J-th region is disposed symmetrically with respect to a second center line, the second center line is a center line of the display panel extending along the fourth direction, wherein N is a positive integer greater than 2 and J is equal to N;

sizes of multiple first compensation structures located at a position of the first region along the fourth direction are the same, and sizes of multiple first compensation structures located in regions corresponding to a same value of J along the fourth direction are the same.

6. The display panel according to claim 5, wherein N=3, multiple regions comprise two first regions, two second regions, and two third regions; wherein a second region is an annular region, a first region is located at a center position of the annular region of the second region, and a third region is located at a peripheral region of the annular region of the second region;

or, wherein on the curved surface where the display panel is located, on a same side of the first center line, from the first compensation structure in a region closest to a center position of an annular region to the first compensation structure in a region farthest from a center position of an annular region, sizes of first compensation structures along the fourth direction gradually decrease.

7. The display panel according to claim 1, wherein in a curved surface where the display panel is located, a size of the first compensation structure along the fourth direction is proportional to a size of the first base substrate and the second base substrate along a bending direction.

8. The display panel according to claim 7, wherein in a case where all of a size of the first substrate and the second substrate along the second direction, a size of the first substrate and the second substrate along the fourth direction, and a radius of curvature of the display panel remain unchanged, the size of the first compensation structure along the fourth direction has a linear relationship with a sum of sizes of the first base substrate and the second base substrate along the bending direction.

9. The display panel according to claim 8, wherein in the display panel having a size of 14.6 inches and a radius of curvature of 780 mm, a relationship between the size of the first compensation structure along the fourth direction and the sizes of the first base substrate and the second base substrate along the bending direction is expressed through a following formula:

$$y = 30.314x - 0.1673;$$

wherein x is the sum of the sizes of the first base substrate and the second base substrate along the bending direction, y is the size of the first compensation structure along the fourth direction; x is greater than or equal to 0.3 microns and less than or equal to 1 micron; y is greater than or equal to 8 microns and less than or equal to 30 microns.

10. The display panel according to claim 1, wherein in a curved surface where the display panel is located, a size of the first compensation structure along the fourth direction is proportional to a size of the first substrate and the second substrate along the fourth direction.

11. The display panel according to claim 10, wherein in a case where all of a size of the first base substrate and the second base substrate along a bending direction, a width-length ratio of the display panel, and a radius of curvature of the display panel remain unchanged, the size of the first compensation structure along the fourth direction has a linear relationship with the size of the first substrate and the second substrate along the fourth direction; wherein the width-length ratio is a ratio of a size of the display panel along the second direction to a size of the display panel along the fourth direction.

12. The display panel according to claim 11, wherein in the display panel in which sizes of the first base substrate and the second base substrate along the bending direction are both 0.2 microns, the radius of curvature is 780 mm, and the width-length ratio of the display panel is 55%, a relationship between the size of the first compensation structure along the fourth direction and the size of the first substrate and the second substrate along the fourth direction is expressed through a following formula:

$$y = 0.0364x + 0.0131;$$

wherein x is the size of the first substrate and the second substrate along the fourth direction, y is the size of the first compensation structure along the fourth direction; x is greater than or equal to 250 mm and less than or equal to 550 mm; and y is greater than or equal to 8 microns and less than or equal to 20 microns;

or, wherein in the display panel in which sizes of the first base substrate and the second base substrate in the bending direction are both 0.2 mm, the radius of curvature is 780 mm, and the width-length ratio of the display panel is 37%, a relationship between the size of the first compensation structure along the fourth direction and the size of the first substrate and the second substrate along the fourth direction is expressed through a following formula:

$$y = 0.0231x - 0.1021;$$

wherein x is the size of the first substrate and the second substrate along the fourth direction, y is the size of the first compensation structure along the fourth direction; x is greater than or equal to 250 mm and less than or equal to 550 mm; and y is greater than or equal to 5 microns and less than or equal to 15 microns.

13. The display panel according to claim 1, wherein in a range of a width-length ratio greater than or equal to 10% and less than or equal to 60%, a size of the first compensation structure along the fourth direction is proportional to the width-length ratio in a case where all of a radius of curvature, a size of the first base substrate and the second base substrate along a bending direction, and a size of the first substrate and the second substrate along the fourth direction remain unchanged;

wherein the width-length ratio is a ratio of a size of the display panel along the second direction to a size of the display panel along the fourth direction.

14. The display panel according to claim 13, wherein in the display panel in which a radius of curvature is 780 mm, sizes of the first base substrate and the second base substrate along the bending direction are both 0.15 mm, and a size of the first substrate and the second substrate along the fourth direction is 327.7 mm, a relationship between the size of the first compensation structure along the fourth direction and the width-length ratio is expressed through a following formula:

$$y = 19.536x - 1.823;$$

wherein x is the width-length ratio of the display panel, y is the size of the first compensation structure along the fourth direction; a value range of x is greater than or equal to 10% and less than or equal to 60%; y is greater than or equal to 0.9 microns and less than or equal to 9 microns.

15. The display panel according to claim 1, wherein a size of the first compensation structure along the fourth direction is proportional to a displacement amount of the display panel along a bending direction;
the displacement amount of the display panel along the bending direction is a vertical distance between a position of a center line of the display panel having a curved structure extending along the second direction and a position of a midpoint of a line connecting two ends of the display panel having the curved structure.

16. The display panel according to claim 15, wherein in a case where all of a size of the first substrate and the second substrate along the second direction, a size of the first substrate and the second substrate along the fourth direction, and a size of the first base substrate and the second base substrate along the bending direction remain unchanged, the size of the first compensation structure along the fourth direction has a linear relationship with the displacement amount of the display panel along the bending direction.

17. The display panel according to claim 16, wherein in the display panel in which a size is 12.3 inches and sizes of the first base substrate and the second base substrate along the bending direction are both 0.2 mm, the size of the first compensation structure along the fourth direction and the displacement amount of the display panel along the bending direction are expressed through a following formula:

$$y = 0.5221x - 0.017;$$

wherein x is the displacement amount of the display panel along the bending direction, y is the size of the first compensation structure along the fourth direction; a value range of x is greater than or equal to 2 mm, and less than or equal to 14 mm; y is greater than or equal to 1 micron and less than or equal to 8 microns.

18. The display panel according to claim 15, wherein the displacement amount of the display panel along the bending direction has a following relationship with a radius of curvature of the display panel:

$$M = R - R*\cos((L/2)/R);$$

wherein L is the size of the display panel along the fourth direction, R is the radius of curvature of a curved surface where the display panel is located, and M is the displacement amount of the display panel along the bending direction.

19. The display panel according to claim 1, wherein the black matrix layer further comprises a second compensation structure, the second compensation structure and the first compensation structure are disposed symmetrically with respect to a center line of the first body structure extending along the second direction;
or,
the first substrate further comprises multiple color resistance elements disposed on one side of the first substrate closest to the second substrate, and in the curved surface where the first substrate is located, the multiple color resistance elements are alternately disposed with the first body structure and the first compensation structure in the fourth direction and extend along the second direction.

20. The display panel according to claim 1, wherein the first substrate is further provided with a first alignment layer and multiple support structures, and the black matrix layer and multiple color resistance elements are located between the first alignment layer and the first base substrate, and the support structures are disposed on one side of the first alignment layer closest to the second substrate;
the black matrix layer further comprises multiple third body structures corresponding to the multiple support structures, a third compensation structure is provided on at least one of the third body structures, and in the curved surface where the first substrate is located, the third compensation structure is located on one side of the third body structure in the fourth direction;
an orthographic projection of a support structure on the second substrate is located within a range of orthographic projections of the third body structure the third compensation structure on the second substrate; there is an overlapping region between the third body structure and the first body structure; a size of the third body structure and the third compensation structure along the fourth direction is larger than a size of the first body structure and the first compensation structure along the fourth direction.

21. The display panel according to claim 20, wherein the display panel is bent toward a side of the second substrate farthest from the first substrate, and in the fourth direction, for any set of a third body structure and a third compensation structure, the third compensation structure is located between the third body structure and a first center line; or, the display panel is bent toward a side of the first substrate farthest from the second substrate, and in the fourth direction, for any set of a third body structure and a third compensation structure, the third body structure is located between the third compensation structure and a first center line; wherein the first center line is a center line of the display panel extending along the second direction.

22. The display panel according to claim 21, wherein multiple second signal lines and vias are further provided on a side of the second base substrate closest to the first substrate, and the second signal lines extend along the fourth direction in the curved surface where the second substrate is located and are arranged along the second direction;
the black matrix layer further comprises multiple second body structures corresponding to the multiple second signal lines, and the multiple second body structures extend along the fourth direction in the curved surface where the first substrate is located, and are arranged along the second direction;
orthographic projections of the multiple second signal lines and the vias on the second substrate are within a range of an orthographic projection of a corresponding second body structure on the second substrate; and there is an overlapping region between the first body structure, the second body structure, and the third body structure;

or, wherein the black matrix layer further comprises a fourth compensation structure, and the fourth compensation structure and the third compensation structure are disposed symmetrically with respect to a center line of the third body structure extending along the second direction.

23. The display panel according to claim 20, wherein the black matrix layer further comprises a fifth compensation structure and a sixth compensation structure, and the fifth compensation structure and the sixth compensation structure are disposed symmetrically with respect to a center line of the third body structure extending along the fourth direction.

24. A display apparatus, comprising at least one display panel according to claim 1.

\* \* \* \* \*